United States Patent
Ong

(10) Patent No.: US 11,846,927 B2
(45) Date of Patent: Dec. 19, 2023

(54) METHOD FOR CONTROLLING DIMENSIONAL TOLERANCES, SURFACE QUALITY, AND PRINT TIME IN 3D-PRINTED PARTS

(71) Applicant: Stratasys, Inc., Eden Prairie, MN (US)

(72) Inventor: Joel Ong, Eden Prairie, MN (US)

(73) Assignee: Stratasys, Inc., Eden Prairie, MN (US)

( * ) Notice: Subject to any disclaimer, the term of this patent is extended or adjusted under 35 U.S.C. 154(b) by 0 days.

(21) Appl. No.: 17/856,860

(22) Filed: Jul. 1, 2022

(65) Prior Publication Data

US 2023/0004143 A1 Jan. 5, 2023

Related U.S. Application Data

(60) Provisional application No. 63/218,247, filed on Jul. 2, 2021.

(51) Int. Cl.
*G05B 19/4093* (2006.01)
*G06T 19/20* (2011.01)
(Continued)

(52) U.S. Cl.
CPC ...... *G05B 19/40931* (2013.01); *B29C 64/393* (2017.08); *B33Y 50/02* (2014.12);
(Continued)

(58) Field of Classification Search
CPC .... G05B 19/40931; G05B 2219/49023; B29C 64/393; B29C 64/135; B29C 64/124;
(Continued)

(56) References Cited

U.S. PATENT DOCUMENTS

2015/0158252 A1\* 6/2015 Liu .................. G05B 15/02
700/98
2016/0144575 A1\* 5/2016 Rizzo, Jr. ........... G05B 19/4083
425/135
(Continued)

FOREIGN PATENT DOCUMENTS

WO 2018006029 A1 1/2018
WO 2019195062 A1 10/2019

OTHER PUBLICATIONS

International Search Report and Written Opinion for International Patent Application PCT/US2022/036023 dated Jan. 19, 2023; 15 pages.

(Continued)

*Primary Examiner* — Kidest Bahta
(74) *Attorney, Agent, or Firm* — Run8 Patent Group, LLC; Peter Miller

(57) ABSTRACT

A method for generating print images for additive manufacturing includes: accessing a part model; accessing a set of dimensional tolerances for the part model; and segmenting the part model into a set of model layers. The method also includes, and, for each model layer: detecting an edge in the model layer; assigning a dimensional tolerance to the edge; defining an outer exposure shell inset from the edge by an erosion distance inversely proportional to a width of the dimensional tolerance; defining an inner exposure shell inset from the outer exposure shell and scheduled for exposure separately from the outer exposure shell; defining an outer exposure energy proportional to the width of the dimensional tolerance and assigned to the outer exposure shell; and defining an inner exposure energy greater than the outer exposure energy and assigned to the inner exposure shell.

20 Claims, 7 Drawing Sheets

(51) Int. Cl.
*G06T 7/11* (2017.01)
*G06T 7/13* (2017.01)
*G06T 7/73* (2017.01)
*B33Y 50/02* (2015.01)
*B29C 64/393* (2017.01)
*G06T 7/62* (2017.01)
*B29C 64/135* (2017.01)

(52) U.S. Cl.
CPC .................. *G06T 7/11* (2017.01); *G06T 7/13* (2017.01); *G06T 7/62* (2017.01); *G06T 7/75* (2017.01); *G06T 19/20* (2013.01); *B29C 64/135* (2017.08); *G05B 2219/49023* (2013.01); *G06T 2219/012* (2013.01); *G06T 2219/2008* (2013.01)

(58) Field of Classification Search
CPC ....... B29C 64/386; B33Y 50/02; B33Y 10/00; B33Y 50/00; G06T 7/11; G06T 7/13; G06T 7/62; G06T 7/75; G06T 19/20; G06T 2219/012; G06T 2219/2008
See application file for complete search history.

(56) References Cited

U.S. PATENT DOCUMENTS

| | | |
|---|---|---|
| 2016/0303795 A1 | 10/2016 | Liu et al. |
| 2017/0297261 A1 | 10/2017 | Schultheiss et al. |
| 2018/0029296 A1 | 2/2018 | Esbroeck et al. |
| 2018/0056607 A1 | 3/2018 | Socha-Leialoha |
| 2019/0210284 A1* | 7/2019 | Bosveld .................. B29C 64/25 |
| 2019/0389134 A1 | 12/2019 | Woytowitz |
| 2020/0102450 A1 | 4/2020 | Lee et al. |
| 2020/0171605 A1 | 6/2020 | McCarthy et al. |
| 2020/0376553 A1* | 12/2020 | DeMuth ............... G02B 27/108 |

OTHER PUBLICATIONS

Notification for the International Application Number and the International Filing Date for International Patent Application No. PCT/US2022/036023 dated Jul. 25, 2022; 1 page.
ESSR received in EP App. No. 19879943.9 dated Jul. 18, 2022.

* cited by examiner

US 11,846,927 B2

METHOD FOR CONTROLLING DIMENSIONAL TOLERANCES, SURFACE QUALITY, AND PRINT TIME IN 3D-PRINTED PARTS

CROSS REFERENCE TO RELATED APPLICATIONS

This application claims the benefit of U.S. Provisional Application No. 63/218,247, filed on 2 Jul. 2021, which is incorporated in its entirety by this reference.

This application is related to U.S. patent application Ser. No. 17/173,174, filed on 10 Feb. 2021, Ser. No. 16/852,078, filed on 17 Apr. 2020, Ser. No. 16/672,410, filed on 1 Nov. 2019, and Ser. No. 16/672,415, filed on 1 Nov. 2019, each of which is incorporated in its entirety by this reference.

TECHNICAL FIELD

This invention relates generally to the field of additive manufacturing and more specifically to a new and useful method for controlling dimensional tolerances, surface quality, and print time in 3D-printed parts in the field of additive manufacturing.

DESCRIPTION OF THE EMBODIMENTS

The following description of embodiments of the invention is not intended to limit the invention to these embodiments but rather to enable a person skilled in the art to make and use this invention. Variations, configurations, implementations, example implementations, and examples described herein are optional and are not exclusive to the variations, configurations, implementations, example implementations, and examples they describe. The invention described herein can include any and all permutations of these variations, configurations, implementations, example implementations, and examples.

1. Method

Figure 1:
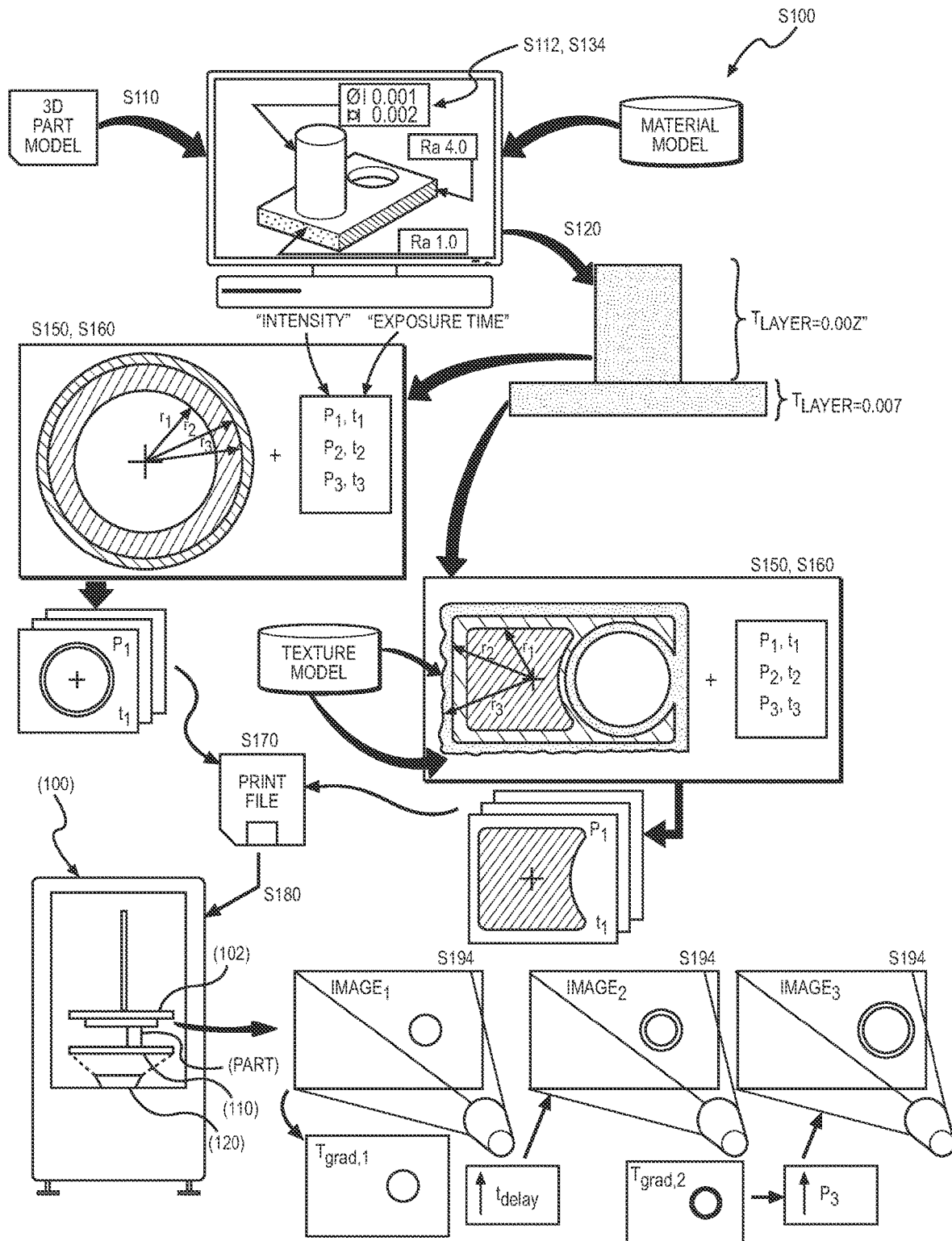
FIG. 1 is a flowchart representation of a method.
Figure 3:
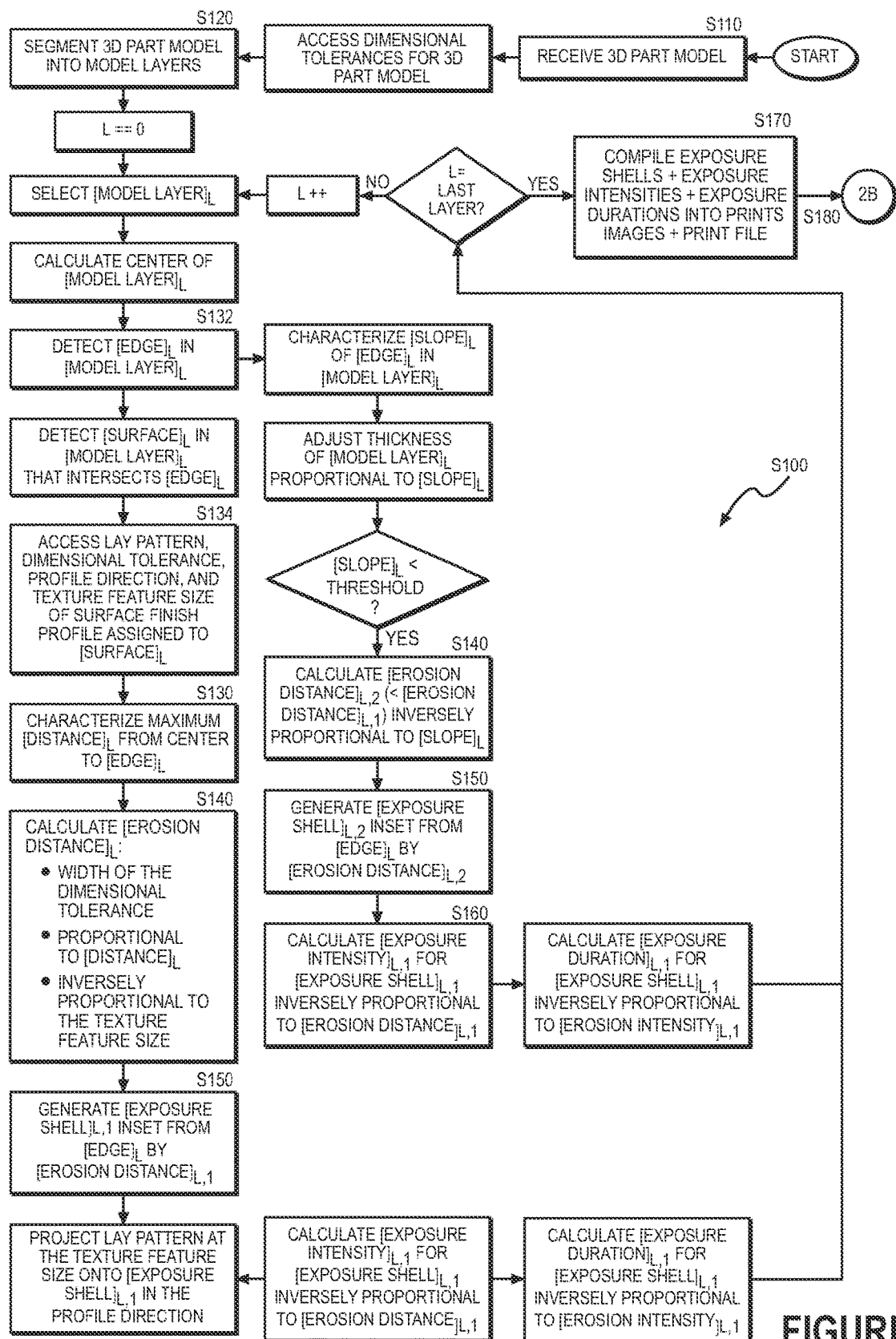
FIG. 3 is a flowchart representation of one variation of the method.

As shown in FIGS. 1 and 3, a method S100 for generating print images for additive manufacturing includes: accessing a part model including a three-dimensional representation of a part in Block S110; and segmenting the part model into a set of model layers in Block S120.

The method S100 also includes, for a first model layer in the set of model layers: characterizing a first distance of a first feature, on a first edge in the first model layer, from a first center of the first model layer in Block S130; calculating a first erosion distance inversely proportional to a first dimension of the first feature and proportional to the first distance in Block S140; and defining a first print image, in a set of print images, including a first exposure area inset from the first edge of the first model layer by the first erosion distance in Block S150. The method S100 further includes, for a second model layer in the set of model layers: characterizing a second distance of a second feature, on a second edge in the second model layer, from a second center of the second model layer in Block S130; calculating a second erosion distance inversely proportional to a second dimension of the second feature and proportional to the second distance in Block S140; and defining a second print image, in the set of print images, including a second exposure area inset from the second edge of the second model layer by the second erosion distance in Block S150.

The method S100 also includes: compiling the set of print images into a digital print file in Block S170; and serving the print file to an additive manufacturing system 100 configured to selectively expose layers of resin according to print images in the digital print file to manufacture the part in Block S180.

1.1 Alternate Print Images

Figure 4A:
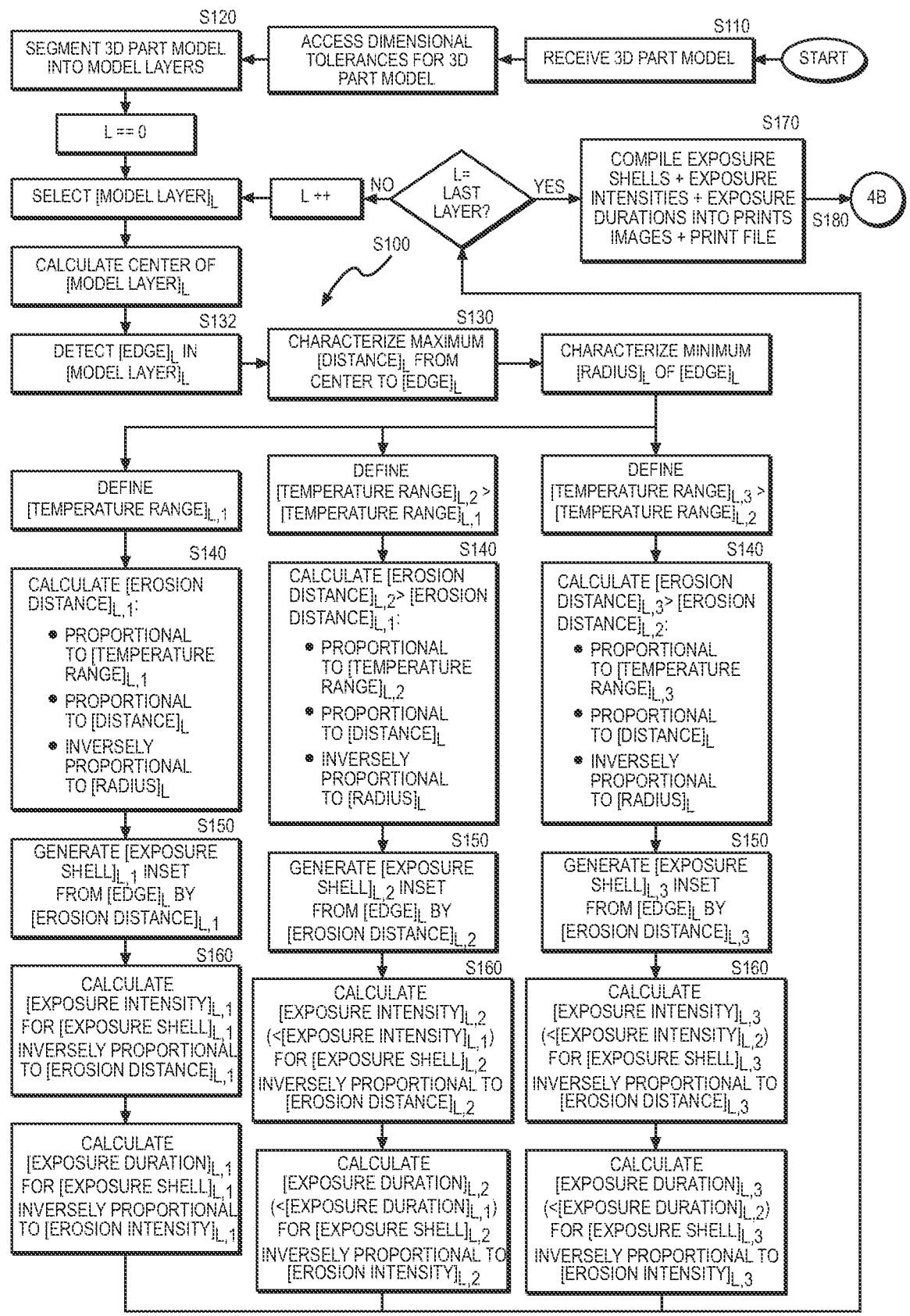
FIGS. 4A and 4B is a flowchart representation of one variation of the method.
Figure 4B:
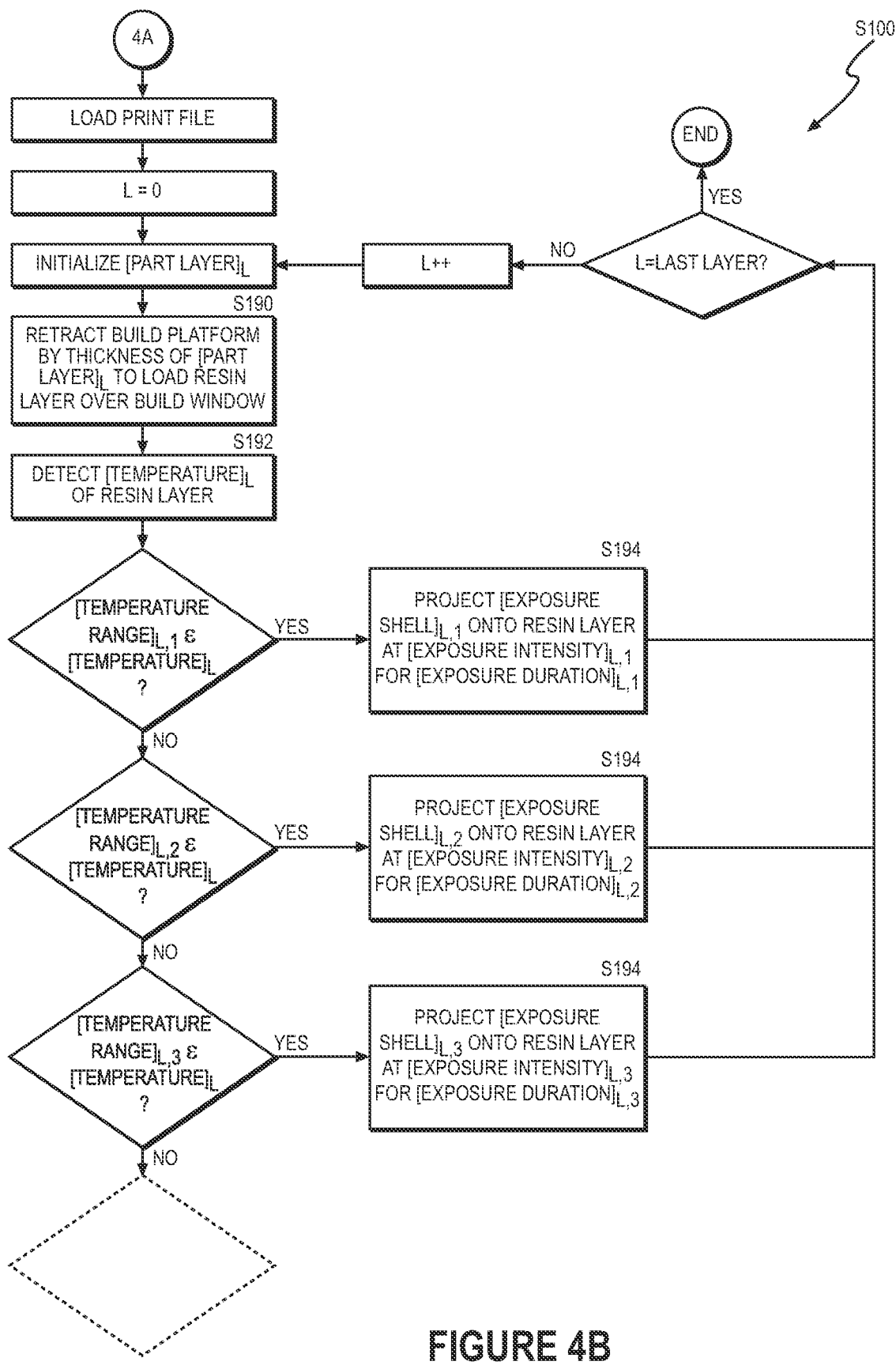

As shown in FIGS. 4A and 4B, one variation of the method S100 includes: accessing a part model including a three-dimensional representation of a part in Block S110; and segmenting the part model into a set of model layers in Block S120.

This variation of the method S100 also includes, for a first model layer in the set of model layers: characterizing a first distance of a first feature, on a first edge in the first model layer, from a first center of the first model layer in Block S130; calculating a first erosion distance proportional to the first distance and associated with a first pre-exposure temperature range in Block S140; defining a first print image, in a set of print images, including a first exposure area inset from the first edge of the first model layer by the first erosion distance in Block S150; calculating a first alternate erosion distance proportional to the first distance and associated with a first alternate pre-exposure temperature range in Block S140, the first alternate erosion distance greater than the first erosion distance, the first alternate pre-exposure temperature range greater than the first pre-exposure temperature range; and defining a first alternate print image, in the set of print images, including a first alternate exposure area inset from the first edge of the first model layer by the first alternate erosion distance in Block S150.

This variation of the method S100 further includes, for a second model layer in the set of model layers: characterizing a second distance of a second feature, on a second edge in the second model layer, from a second center of the second model layer in Block S130; calculating a second erosion distance proportional to the second distance in Block S140; and defining a second print image, in the set of print images, including a second exposure area inset from the second edge of the second model layer by the second erosion distance in Block S150.

This variation of the method S100 also includes, by an additive manufacturing system 100: loading a first volume of resin into a first interstitial volume over a build window in Block S190; detecting a temperature of the first volume of resin in Block S192; in response to the temperature of the first volume of resin falling within the first resin temperature range, exposing the first volume of resin according to the first print image in Block S194 to selectively polymerize resin within a first region of the first volume of resin and to form a first part layer of the part, the first region of the first volume of resin approximating the first edge of the first model layer; loading a second volume of resin into a second interstitial volume between the build window and the first part layer of the part in Block S190; and exposing the second volume of resin according to the second print image in Block S194 to selectively polymerize resin within a second region of the second volume of resin and to form a second part layer of the part, the outer region of the second volume of resin approximating the second edge of the second model layer.

1.2 Dimensional Tolerances

As shown in FIGS. 4A and 4B, one variation of the method S100 includes: accessing a part model including a three-dimensional representation of a part in Block S110; accessing a set of dimensional tolerances for the part model in Block S112; and segmenting the part model into a set of model layers in Block S120.

This variation of the method S100 also includes, for a first model layer in the set of model layers: detecting a first edge in the first model layer in Block S132; assigning a first dimensional tolerance, in the set of dimensional tolerances, to the first edge in Block S134; defining a first set of exposure shells in Block S150 including a first outer exposure shell inset from the first edge by a first erosion distance inversely proportional to a first width of the first dimensional tolerance and a first inner exposure shell inset from the first outer exposure shell and scheduled for exposure separately from the first outer exposure shell; and defining a first set of exposure energies (i.e., "energy fluxes") in Block S160 including a first outer exposure energy proportional to the first width of the first dimensional tolerance and assigned to the first outer exposure shell and a first inner exposure energy greater than the first outer exposure energy and assigned to the first inner exposure shell.

This variation of the method S100 further includes, for a second model layer in the set of model layers: detecting a second edge in the second model layer in Block S132; assigning a second dimensional tolerance, in the set of dimensional tolerances, to the second edge in Block S134; defining a second set of exposure shells in Block S150 including a second outer exposure shell inset from the second edge by a second erosion distance inversely proportional to a second width of the second dimensional tolerance; and defining a second set of exposure energies in Block S150 including a second outer exposure energy proportional to the second width of the second dimensional tolerance and assigned to the second outer exposure shell.

This variation of the method S100 also includes: compiling the first set of exposure shells, the first set of exposure energies, the second set of exposure shells, and the second set of exposure energies into print image in a digital print file in Block S170; and serving the print file to an additive manufacturing system 100 configured to selectively expose layers of resin according to print images in the digital print file to manufacture the part in Block S180.

2. Applications

As shown in FIG. 1, the method S100 can be executed by a computer system in conjunction with an additive manufacturing system 100 (hereinafter the "manufacturing system 100") to control print duration, dimensional accuracy, and surface finish quality of a 3D-printed part. In particular, the computer system can: interface with a user to assign dimensional tolerances and surface finish qualities (e.g., textures) to regions of a 3D part model; extract these characteristics directly from the model; or retrieve the characteristics from secondary data (e.g., a texture and dimensional tolerance file or lookup table) provided by the user. The computer system can then automatically: segment the 3D part model into a sequence of model layers; segment each model layer into a set of nesting layer shells; and assign print parameters (e.g., exposure time and/or exposure intensity, exposure energy) to each layer shell based on these dimensional tolerances and surface finish qualities.

Generally, when a region of a volume of resin—arranged over a build window in the manufacturing system 100—is exposed to radiation (e.g., "light"), monomers and/or oligomers in the exposed region of resin cross-link to form polymers and thus form a solid layer of a part (i.e., a "print layer"). However, a polymerized region of the volume of resin may differ from the exposed region of the volume of resin. For example, over-exposure of the resin at excess exposure intensity and/or over excess exposure duration (i.e., excess power exposure) may cause the resin to polymerize outwardly past the exposed region of the resin: such that the polymerized region of the resin layer is larger than the exposed region; and/or such that smaller, detailed features defined along the perimeter of the exposed region of the resin layer are lost (or "overwhelmed," "consumed") by polymerization reactions continuing beyond the exposed region. Such excess power exposure of the resin relative to energy at which the resin polymerizes may therefore reduce the dimensional accuracy, surface finish control, and fidelity of this print layer of the part.

In the foregoing example, in addition to extending laterally beyond the exposed region of the volume of resin, such polymerization bleed may also extend vertically (e.g., upwardly) to a preceding print layer of the part, thereby: polymerizing uncured resin present on the surface of the preceding print layer; increasing the size of the preceding print layer; over-coating smaller, detailed features in this preceding print layer; and thus diminishing dimensional accuracy, surface finish control, and fidelity of the preceding print layer of the part.

Conversely, under-exposure of the resin at insufficient exposure intensity and/or over an insufficient exposure duration (i.e., insufficient power exposure) may yield insufficient polymerization of the layer of resin: such that the polymerized region of the layer of resin is smaller than the exposed region; such that smaller, detailed features defined along the perimeter of the exposed region are lost due to insufficient polymerization; and/or such that this layer of resin fails to bond to the preceding print layer of the part. Such insufficient power exposure of the resin relative to energy at which the resin polymerizes may therefore diminish dimensional accuracy, surface finish control, and fidelity of this print layer of the part and increasing likelihood of print failure.

Therefore, for each model layer of the 3D part model, the computer system can execute the method S100 to define a print image and print parameters that, when executed by the manufacturing system 100: produce at least a minimum crosslink density across the corresponding part layer and between the part layer and the preceding part layer (e.g., hereinafter "target polymerization") to achieve a minimum green strength and inter-layer bond strength of the part; achieve dimensional accuracy of the part layer that fulfills dimensional tolerances assigned to vertices, surfaces, and regions of the corresponding model layer; achieve selective polymerization along the perimeter of the part layer that replicates surface finishes (e.g., textures) assigned to edges of the corresponding model layer; and reduce warpage of the final part due to internal stresses from interlayer shrinkage or thermal expansion effects during fabrication.

For example, to achieve tighter dimensional tolerances and/or tighter surface finish controls, the computer system can segment a 3D part model into more, thinner model layers and segment each of these model layers into a greater quantity of nested shell layers. Thus, when the manufacturing system 100 sequentially exposes a layer of resin to print images across to a sequence of nested shell layers, the manufacturing system 100 can incrementally approach a target cross-section of this part layer: with minimal or no polymerization of resin beyond the dimensional tolerance of the boundary of this target cross-section; and with target polymerization of resin within the dimensional tolerance of the boundary of this target cross-section. Conversely, to achieve faster print times (at the expense of dimensional tolerances and/or surface finish controls), the computer system can segment a 3D part model into fewer, thicker model layers and segment each of these model layers into a smaller quantity of nested shell layers, thereby enabling the manufacturing system 100 to complete each part layer of the part in less time and thus reduce the total print time for the part.

3. Manufacturing System

Generally, the computer system can interface with a manufacturing system 100, such as described in U.S. patent application Ser. No. 16/672,415, to polymerize (or "print") a sequence of layers of resin to form a three-dimensional volumetric representation of the part model. In particular, the manufacturing system 100 is configured to print a part according to a print file—containing a sequence of print images—generated by the computer system according to the method S100.

Figure 5:
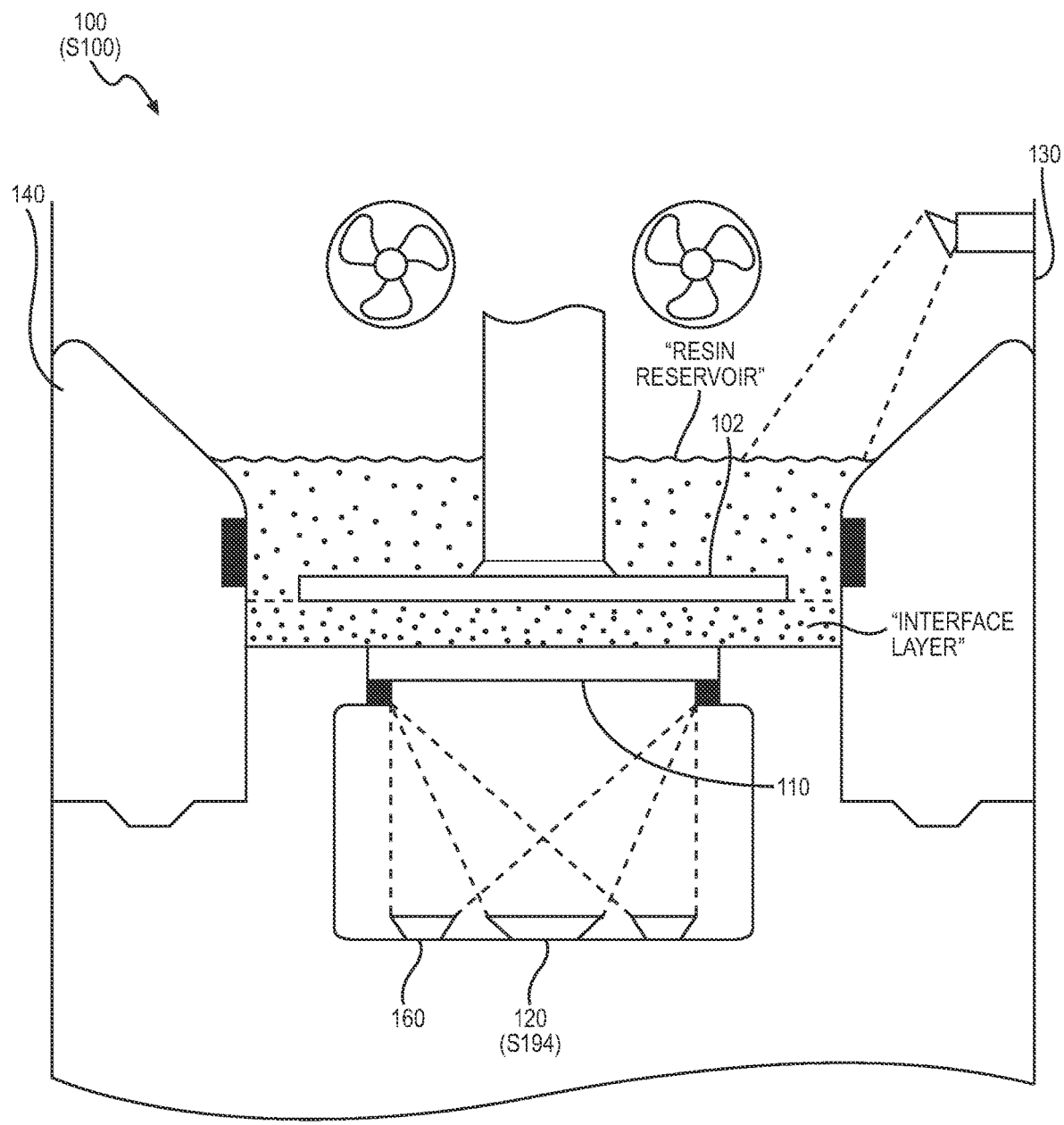
FIG. 5 is a schematic representation of a system.

As shown in FIG. 5, the manufacturing system 100 can include an assembly of electromechanical components controlled by an imbedded computational device running computer code (hereinafter the "controller"). More specifically, the manufacturing system 100 includes a base assembly and a removable tray assembly (hereinafter "tray assembly"). The base assembly can include: a projection subsystem 120, a build window no, a build platform 102, and a build chamber 130. The tray assembly can include a build tray 140 configured to engage with the base assembly and contain the resin reservoir above the build window no and within the build chamber 130, thereby enabling the manufacturing system 100 to project electromagnetic radiation into a layer of resin adjacent the resin interface (i.e. the interface layer). The manufacturing system 100 also includes electromechanical components configured to detect and regulate the chamber temperature of the gaseous environment of the build chamber 130, the bulk resin temperature of the resin reservoir in the build tray 140, and the interface temperature of the interface layer of resin adjacent the resin interface. These electromechanical components can include: the chamber temperature control subsystem, the resin temperature control subsystem, and the interface temperature control subsystem. Each of these temperature control subsystems are described in further detail below.

The manufacturing system 100 can execute a "bottom-up" digital light process (e.g., "DLP"). The projection subsystem 120 can therefore face upward and project electromagnetic radiation (e.g., ultraviolet, near-ultraviolet, or visible) light through the build window 110 into the interface layer of resin at the resin interface (i.e. the interface between the reservoir and the build window 110); and the build platform 102 can be arranged vertically over the projection subsystem 120 and build window no and can be configured to advance and retract vertically as layers of a build are selectively photocured at the resin interface by electromagnetic radiation output by the projection subsystem 120. Additionally, the projection subsystem 120, build window no, and build platform 102 can be fully enclosed by a sealed build chamber 130, thereby enabling control of the ambient pressure and bulk temperature of the resin reservoir.

3.1 Projection Subsystem

The projection subsystem 120 includes upward facing, is housed in the base assembly, and can include one or more projectors configured to project electromagnetic radiation in an emissive spectrum, which can include the ultraviolet (hereinafter "UV"), visible, or near infrared (hereinafter "NIR") spectrum. The projection subsystem 120 can emit electromagnetic radiation in one or more wavelength bands tuned to the chemical and physical properties of the resin and its specific curing process. For example, the projection subsystem 120 (e.g., a digital UV projector) can project electromagnetic radiation in an emissive spectrum of 300-nanometer to 450-nanometers. The projection subsystem 120 is electrically coupled to the controller; receives potentially software-modified frames corresponding to full or partial cross-sections of a three-dimensional model of the build; and projects electromagnetic radiation through the build window 110 to selectively photocure volumes of the resin according to build settings and the received frames.

In one variation, the manufacturing system 100 can include a projection subsystem 120, which further includes a set of light sources, such as projectors or other electromagnetic emitting devices. In this variation, each irradiation source of the projection subsystem 120 can define a projective area within the build window 110 in order to maintain a higher resolution across the build window no via tiling or stitching techniques. Additionally or alternatively, each light source can define a separate emissive spectrum enabling the projection subsystem 120 to project electromagnetic radiation within multiple combinations of spectral bands.

In one variation, the projection subsystem 120 includes a UV or near-UV laser and scans (e.g., as a raster) a laser beam across the build window no according to frames received from the controller in order to selectively photocure a volume of resin at the resin interface.

3.2 Build Window

The build window no is mounted to the base assembly and further defines the horizontal reference plane for builds manufactured in the manufacturing system 100. The build window no is arranged above the projection subsystem 120 and aligned with the projection area of the projection subsystem 120 such that the focal plane of the projection subsystem 120 coincides with the resin interface. Generally, the build window no is substantially transparent (e.g., exhibiting greater than 85% transmittance) to the emissive spectrum of the projection subsystem 120 and thus passes electromagnetic radiation output by the projection subsystem 120 into the resin above the build window no. The build window no also functions as a rigid support and reference surface for the interface layer of resin arranged thereover. The build window no is statically mounted to a base assembly that can include the projection subsystem 120, the build platform 102 and/or the build chamber 130 to ensure repeatable, accurate alignment between the build window 110 and the rest of the base assembly. The interface between the base assembly and the build window no is also gas-impermeable such that a pressure gradient, such as 300 kilopascals, can be sustained across the build window no.

The base assembly can include a build window no manufactured from a pane of transparent, rigid glass, such as amorphous/silicate or crystalline/ceramic glass. In particular, the build window no can be both transparent to UV (or other) light output by the projection subsystem 120 and can be substantially rigid, hard, and temperature-stable to form a robust, flat reference surface that may exhibit minimal deflection or deformation during multiple build cycles, thereby yielding high and consistent build quality.

In one variation, the base assembly can include a build window no that is transmissive to infrared (hereinafter "IR") radiation such that a thermal image sensor 160 positioned below the build window no can accurately calculate the temperature of the resin at the resin interface. In this variation, the manufacturing system 100 can also transmit IR radiation directly through the build window no, thereby enabling targeted heating of specific regions of the interface layer of resin.

3.3 Build Platform

Generally, the base assembly also includes a build platform 102 to which a first layer of the build adheres and from which the build is suspended toward the build window no during a manufacturing process. More specifically, the base assembly can include a build platform 102 defining a planar surface opposite and substantially parallel to the upper surface of the build window 110; and a linear actuation manufacturing system 100 (including a single linear actuator or multiple timed linear actuators) configured to vertically translate the build platform 102 relative to the build window no. In one implementation, the manufacturing system 100 can include a build platform 102 defining negative features, such as channels or through holes to increase the flow of resin out from under the build platform 102 during advancement of the build platform 102 into the resin reservoir and to facilitate (by reducing the adhered surface area) the removal of the build from the build platform 102 after completion of the build.

The build platform 102 is a vertically actuating surface opposite the build window no. The manufacturing system 100 can include a linear actuation manufacturing system 100 (with increments as small as 0.1 microns) mechanically coupled to the build platform 102. Additionally, during actuation of the linear actuation manufacturing system 100, the controller: can track forces applied by the linear actuation manufacturing system 100 to the build platform 102 (e.g., based on a current draw of the linear actuation manufacturing system 100 or by sampling a force sensor or strain gauge coupled to the build platform 102); and implement closed-loop techniques to control movement of the linear actuation manufacturing system 100 in order to achieve a particular distribution of separation forces. Thus, during the build cycle, the linear actuation manufacturing system 100 lowers the build platform 102 to specific heights above build window no such that photocured resin adheres to the build surface of the build platform 102 facing the build window no. As the manufacturing system 100 selectively cures successive layers of the build, the manufacturing system 100 can retract the build platform 102 upward by a first distance in order to separate the current layer of the build from the build window 110 and then advance the build platform 102 in preparation for curing a successive layer of the build.

3.4 Build Chamber

The manufacturing system 100 includes a sealed (i.e. airtight up to five atmospheres build chamber 130 that encloses) the build window no, build tray 140, build platform 102 and/or any of the other previously described components of the manufacturing system 100. The build chamber 130 is configured to allow access to the build platform 102 and to allow insertion and removal of the build tray 140 (e.g., via a hatch/door manufacturing system 100) to remove completed builds from the manufacturing system 100, to fill the build tray 140 with resin, and/or to remove and replace the build tray 140. Additionally, the build chamber 130 contains the gaseous environment located above the resin reservoir and the build tray 140 into which the build platform 102 is retracted during the manufacturing process. Therefore, the build chamber 130 can include fluid ports and/or valves in order to pressurize and/or exchange gas from within the build chamber 130 with the ambient environment and/or with an inert gas reservoir.

In one implementation, further described below, the build chamber 130 can cooperate with a resin dispensing manufacturing system 100 to regulate the volume of resin contained within the build tray 140 without opening the build chamber 130.

3.5 Build Tray

The tray assembly includes a build tray 140 configured to engage (and kinematically align with) the base assembly of the manufacturing system 100. Generally, the build tray 140 contains the resin reservoir during a build cycle such that the resin reservoir is evenly distributed across the build window 110 at the resin interface.

The build tray 140 defines the volume occupied by the resin reservoir during the manufacturing process and the build area for the build created during the manufacturing process. In one implementation, the upper member of the build tray 140 defines a rectangular build area. Additionally, the build tray 140 can define an inner surface that extends upward and perpendicular to the build window 110. The inner surface then angles upward and outward in a conical shape, wherein the vertical cross section of the conical inner surface has dimensions proportionally similar to the vertical cross-section of the perpendicular inner surface. Thus, the perpendicular and conical sections of the inner surface define a volume for containing the resin reservoir. However, the build tray 140 can define any rounded internal volume. Additionally, the build tray 140 can include integrated heating and/or cooling elements (e.g., resistive cooling elements or water-cooling systems) as further described below. The manufacturing system 100 can activate the heating and/or cooling elements to adjust the bulk resin temperature within the build tray 140, as is further described below.

The build tray 140 can also interlock with reference surfaces in the base assembly. In one implementation, the base assembly and/or the build tray 140 contain magnets, which kinematically align the build tray 140 to the base assembly by biasing the build tray 140 against the reference surfaces in the base assembly. Additionally, the build tray 140 can include rubber gaskets arranged at the interface between the build tray 140 and the base assembly, thereby preventing egress of the resin from the resin reservoir held by the build tray 140 between the build tray 140 and the base assembly. Therefore, the build tray 140 can be kinematically positioned over the build window 110 such that the inner surface of the build tray 140 and the upper surface of the build window no form a volume, which can contain the resin reservoir.

The build tray 140 can be constructed from a rigid, non-reactive, temperature stable solid material, such as aluminum or another metal. In one implementation, the build tray 140 is constructed from milled aluminum. Additionally, the build tray 140 can be a member of a set of build trays 140 associated with the manufacturing system 100, each build tray 140 in the set of build trays 140 characterized by a different shape or size.

3.6 Controller

The base assembly of the manufacturing system 100 can include a controller that controls the electromechanical components of the manufacturing system 100. Generally, the controller can include an imbedded computer manufacturing system 100 that sends instructions to the projection subsystem 120, the build platform 102, the resin temperature control subsystem, the interface temperature control subsystem, and the chamber temperature control subsystem. In one implementation, the controller controls and receives instructions from a user interface, which can be a touchscreen or a set of buttons, switches, nobs, etc. Alternatively, the controller can communicate with and receive instructions from an external computational device. In another implementation, the controller is connected to a network, such as the internet, and is configured to receive instructions over the network. Additionally, the controller can send commands, in the form of digital and/or analog electrical signals, in order to actuate various electromechanical components of the manufacturing system 100 such as a door hatch release to the build chamber 130, the purge valves, and/or lighting elements within the build chamber 130. Furthermore, the controller can receive data from sensors integrated with the manufacturing system 100 and execute feedback control algorithms based on these data in order to adjust the function of the projection subsystem 120, the build platform 102, the resin temperature control subsystem, the interface temperature control subsystem, and the chamber temperature control subsystem.

3.7 Interface Temperature Sensor

Generally, the manufacturing system 100 can include a set of temperature sensing elements configured to measure the temperature of the interface layer of resin (e.g., either an average temperature or a temperature distribution), such as a set of thermocouples, thermistors, or digital thermometers arranged at the perimeter of the build window no and configured to measure the temperature of the build window 110. Thus, the manufacturing system 100 can indirectly measure the temperature of the interface layer via conduction through the build window no.

Additionally or alternatively, the manufacturing system 100 can include an interface thermal image sensor 160 configured to directly measure infrared or near-infrared radiation emitted by the interface layer of resin and calculate the temperature of the interface layer for each pixel of the interface thermal image sensor 160.

3.7.1 Interface Thermal Image Sensor

The manufacturing system 100 can also include a thermal image sensor 160 arranged under the build window no and defining a field of view that spans the area of the resin interface of the build window no. Thus, the manufacturing system 100, via the thermal image sensor 160, can detect the interface temperature of the resin at the resin interface. The thermal image sensor 160 is electrically coupled to the controller, thereby enabling the controller to record thermal images of the resin interface. In one implementation, the thermal image sensor 160 is arranged relative to the projection subsystem 120 and interface heat source such that pixels in images captured from the thermal image sensor 160 correspond to pixels for projection of electromagnetic radiation from the projection subsystem 120 and/or areas of the resin interface at which the interface heat source can precisely direct heat. In one implementation, the thermal image sensor 160 operates in the long-wavelength IR range (i.e. 8-15 micrometers), thereby enabling the interface thermal image sensor 160 to detect temperature differences within the resin. Additionally or alternatively, the thermal image sensor 160 can operate within the mid-wavelength IR range (i.e. 3-8 micrometers). Thus, the manufacturing system 100 can detect a temperature of the interface layer via a thermal image sensor 160 arranged below the build window 110 and defining a field of view encompassing the resin interface.

4. Part Model

In one implementation, the computer system accesses (or "ingests") a 3D part model, such as uploaded by a user or retrieved from a local or remote database. For example, the part model can include: a solid model defining a volume of a 3D part between its interior or exterior surfaces; or a mesh defining target interior and exterior surfaces of the 3D part.

5. Model Annotation

The computer system can then: render the 3D part model within a user interface; render 3D part model in the user interface; detect interior and/or exterior surfaces within the 3D part model; and highlight these surfaces within the user interface or otherwise prompt the user to annotate these surfaces with dimensional, surface finish, and/or other target characteristics.

5.1 Surface Sector Delineation

In one example, the computer system: detects faces in the 3D part model; and defines a set of abutting (i.e., non-overlapping) surface sectors that a) altogether span all interior and exterior surfaces of the 3D part model and that b) individually span a single face detected in the 3D part model.

In another example, the computer system detects a constellation of vertices and edges in 3D part model. Then, based on these vertices and edges, the computer system defines a set of abutting (i.e., non-overlapping) surface sectors: that altogether span all interior and exterior surfaces of the 3D part model; and that individually define the shortest perimeter lengths between vertices and along edges in the 3D part model.

In yet another example, the computer system: defines a grid density; projects a mesh—at the grid density—onto the interior and exterior surfaces of the 3D part model; snaps gridlines in the mesh onto vertices and edges detected in the 3D part model; and then defines a surface sector within each grid unit in the mesh. In this example, the computer system can set the grid density such that each surface sector approximates a target surface area (e.g., one centimeter), such as preset or selected by the user via a slider rendered within the user interface. Alternatively, the computer system can set the grid density such that each surface sector approximates a target proportion (e.g., 5%) of the total surface area of the 3D part model, such as preset or selected by the user via a slider rendered within the user interface. Therefore, in this example, the computer system can apply a uniform grid density across an entire 3D part model.

Alternatively, the computer system can enable user to isolate subregions of the 3D part model, such as: by selecting subvolumes (e.g., bosses, extrusions) and/or subsurfaces (e.g., cavities) delineated by edges or faces in the 3D part model; or by manually drawing, selecting, or delineating subvolumes or subsurfaces within the 3D part model. The computer system can then project a mesh—and therefore define a set of surface sectors—onto each subregion in the 3D part model according to its designated grid density.

However, the computer system can implement any other method or technique to delineate surface sectors on interior and/or exterior surfaces of the 3D part model. The computer system can then interface with the user to assign print characteristics to individual surface sectors or groups of surface sectors.

5.2 Dimensional Accuracy

The computer system can then populate surface sectors within the 3D part model with dimensional tolerances, such as including: distances between features; lengths of features; flatness callouts; parallelism callouts; cylindricity; and/or over-under tolerance callouts.

In one implementation, the 3D part model: defines a nominal part geometry; and includes dimensions and/or dimensional tolerances on various faces, edges, and vertices. Therefore, in this implementation, the computer system can: extract geometric dimensional tolerances from the 3D part model; interpret thickness, straightness, flatness, and/or cylindricity tolerances, etc. for subvolumes and/or subsurfaces from dimensional tolerances contained in the 3D part model; and project these tolerances onto corresponding surface sectors across the interior and exterior surfaces of the 3D part model.

In a similar implementation, the computer system: accesses an engineering drawing, lookup table, or model file associated with the 3D part model; extracts dimensional tolerances from the engineering drawing, lookup table, or model file; and projects these tolerances onto corresponding surface sectors across the interior and exterior surfaces of the 3D part model.

In another implementation, the computer system interfaces with the user to manually annotate surface sectors (or subvolumes or subsurfaces more generally) within the 3D part model with dimensional tolerances.

Alternatively, in the foregoing implementations, the computer system can: abstract dimensional tolerances to a range of dimensional abstractions, such as including: "loose" dimensional control (e.g., up to +/−0.010" from a nominal dimension); "moderate" dimensional control (e.g., up to +/−0.005" from a nominal dimension); and "tight" dimensional control (e.g., up to +/−0.0010" from a nominal dimension). The computer system can then write these dimensional abstractions to individual surface sectors within the 3D part model.

Therefore, the computer system can assign absolute tolerances to individual surface sectors within the 3D part model.

5.3 Surface Finish

The computer system can similarly populate surface sectors within the 3D part model with target surface finishes (or "textures"). For example, a target surface finish can specify a surface finish type, such as: surface roughness (e.g., "Ra"); lay pattern (e.g., vertical, horizontal, radial, cross-hatched, circular, isotropic, concave dimple, convex dimple); or waviness. The target surface finish can additionally or alternatively include a specification, such as: material removal not allowed or required; tolerance direction (e.g., upper or lower); filter (e.g., noise or waviness); and/or dimple (e.g., direction, depth, width).

In one implementation, the 3D part model (or an associated engineering drawing) contains surface finish callouts. Accordingly, the computer system can project these surface finish callouts onto corresponding subvolumes and/or subsurfaces—and therefore onto surface sectors—within the 3D part model.

Alternatively, the computer system can interface with the user to manually annotate surface sectors (or subvolumes or subsurfaces more generally) within the 3D part model with surface finish callouts.

Additionally or alternatively, in the foregoing implementations, the computer system can: abstract surface finishes to a range of surface finish abstractions, such as including: "mirror," "smooth," "rough"; or gloss, semi-gloss, satin, matte, flat. The computer system can then write these surface finish abstractions to individual surface sectors within the 3D part model.

Therefore, the computer system can assign absolute surface finish callouts to individual surface sectors within the 3D part model.

6. Material Selection and Model

The computer system can also receive a material selection for the 3D part model, such as from a menu of available resin formulas currently available for processing in the manufacturing system 100 or by extracting a material specification from the 3D part model.

The computer system can then retrieve a material model that defines correlations between: print parameters (e.g., print layer thickness, light-shell thickness and step size, light-shell exposure intensity, light-shell exposure duration); print outcomes (e.g., intra- and inter-layer dimensional tolerance, polymerization bleed between print layers, surface finish, surface texture, green strength); and part characteristics (e.g., cross-sectional of features, vertical and horizontal aspect ratios of features). For example, the material model can be generated empirically based on results of (many) parts of different geometries and characteristics printed on the same or other manufacturing system 100(s), such as described in U.S. patent application Ser. No. 17/173, 174.

7. 3D Part Model Segmentation

As shown in FIG. 1, the computer system can then: slice the 3D part model into a sequence of model layers, wherein each model layer represents a projection of a 3D "slice" of the 3D part model—in a thin volume of this greatest layer thickness—onto a horizontal 2D plane; and annotate edges of cross-sections represented in these model layers with dimensional tolerances and/or surface finish callouts assigned to surface sectors represented by these edges.

Figure 2A:
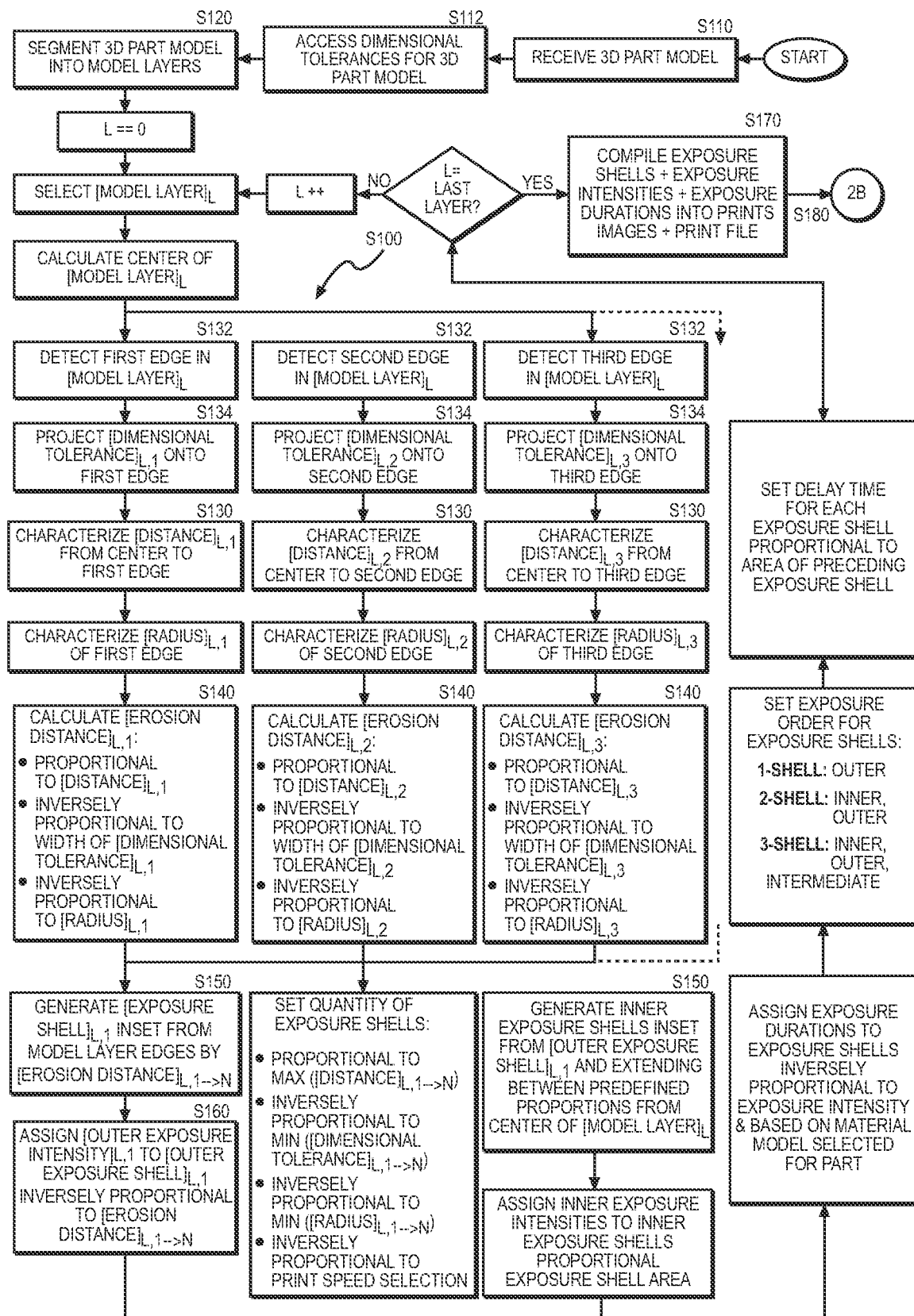
FIGS. 2A and 2B are a flowchart representation of one variation of the method.

In one implementation shown in FIGS. 2A and 4A, the computer system slices the 3D part model into a sequence of model layers of a fixed layer thickness, wherein each model layer represents a projection of a 3D "slice" of the 3D part model—in a thin volume of this fixed layer thickness—onto a horizontal 2D plane. For example, the computer system can slice the 3D part model into model layers of a predefined layer thickness implemented by the manufacturing system 100. In another example, the computer system slices the 3D part model into model layers of a thickness proportional to a narrowest dimensional tolerance assigned to any surface sector in the 3D part model, such as: a 0.012" layer thickness for a narrowest dimensional tolerance of +/−0.010" in the 3D part model; a 0.007" layer thickness for a narrowest dimensional tolerance of +/−0.005" in the 3D part model; and 0.004" layer thickness for a narrowest dimensional tolerance of +/−0.001" in the 3D part model.

In another implementation, the computer system: extracts a first model layer—of a thickness equal to a maximum thickness supported by the manufacturing system 100 (e.g., 0.012")—from a top of the 3D part model; identifies all surface sectors—in the 3D part model—that intersect the first model layer; and imports dimensional tolerances (and surface finish callouts) from this set of surface sectors into the first model layer, such as by labeling continuous edges or edge segments in the first model layer with dimensional tolerances (and surface finish callouts) of corresponding surface sectors in the 3D part model. Then, if the material model indicates a reduced layer thickness to achieve a narrowest dimensional tolerance written to an edge or edge segment in the first model layer (e.g., a maximum layer thickness of 0.007" for a narrowest dimensional tolerance of +/−0.005"), the computer system can reset the thickness of the first model layer to this new maximum layer thickness and extract a new first model layer—of thickness equal to this new maximum thickness—from a top of the 3D part model. The computer system can then repeat this process to iteratively extract and verify thicknesses of subsequent model layers based on dimensional tolerances transferred from surface sectors on the 3D part model to edges of these model layers.

Therefore, the computer system can dynamically slice the 3D part model into a sequence of model layers of various thicknesses based on dimensional tolerances assigned to surface sectors represented by edges or edge segments in each model layer in the sequence.

8. Surface Finish and Texture Projection

In the variation described above in which the user assigns surface finish callouts to surface sectors within the 3D part model, the computer system can also: annotate edges of cross-sections represented in these model layers with surface finish callouts assigned to surface sectors represented by these boundaries, as described above; and then access a parametric or non-parametric texture model that converts these surface finish callouts into new model layer and print parameters predicted to produce these surface finishes in the selected material.

For example, the texture model can link: a) lay patterns (e.g., horizontal, radial, cross-hatched, circular, isotropic, concave dimple, and/or convex dimple lay patterns) defined in surface finish callouts; to b) 2D texture profiles (e.g., 2D sawtooth, sinusoidal, square-wave profiles). The texture model can also: convert profile depth defined in a surface finish callout into 2D texture profile amplitude; convert outset %, inset %, or "on" layer edge specification in a surface finish callout into an offset between the neutral plane of a 2D texture profile and the boundary of a model layer; define print parameters (e.g., target or maximum layer thickness, light-shell thickness and step size, light-shell exposure intensity, light-shell exposure duration) predicted to achieve the texture on a print layer of the part; and/or define a textural tolerance (e.g., a dimensional tolerance for fine features) within which a part surface meets specifications of the surface finish callout.

Accordingly, for a first model layer in the 3D part model, the computer system can detect a first edge or first edge segment assigned a first surface finish callout; and implement the texture model to transform the first surface finish callout into a 2D texture profile, a profile amplitude, a neutral plane offset, and/or print parameter tags (e.g., target or maximum layer thickness, light-shell thickness and step size, light-shell exposure intensity, light-shell exposure duration). The computer system can then snap the 2D texture profile—at the profile amplitude—along the first edge or first edge segment in the first model layer with the neutral plane of the 2D texture profile offset from the first edge or edge segment by the neutral plane offset; and link these print parameter tags to the first edge or edge segment. The computer system can then repeat for each other edge or edge segment in the model layer and for each other model layer in the 3D part model.

In this implementation, the computer system can also: implement the texture model to convert surface texture callouts on surface sectors at a top of the 3D part model into a first maximum or target layer thickness; extract a first model layer—of this first thickness—from the top of the 3D part model; identify all surface sectors—in the 3D part model—that intersect the first model layer; and import dimensional tolerances (and surface finish callouts) from this set of surface sectors into the first model layer, such as by labeling continuous edges or edge segments in the first model layer with dimensional tolerances (and surface finish callouts) of corresponding surface sectors in the 3D part model. If a narrowest dimensional tolerance written to an edge or edge segment in the first model layer necessitates reduced layer thickness according to the material model and/or the texture model, the computer system can reduce the first thickness accordingly and extract a new first model layer—of thickness equal to this new maximum thickness—from the top of the 3D part model. The computer system can then repeat this process to iteratively extract and verify thicknesses of subsequent model layers based on dimensional tolerances transferred from surface sectors on the 3D part model to edges of these model layers.

Therefore, the computer system can dynamically slice the 3D part model into a sequence of model layers of various thicknesses based on both dimensional tolerances and surface finish callouts assigned to surface sectors represented by edges or edge segments in each model layer in the sequence.

In a similar implementation shown in FIG. 3, the computer system can: access a surface finish profile (e.g., 2D texture profile, surface finish callout) assigned to a first surface of the part; slice the 3D part model into a set of model layers; detect a first edge in a first model layer; and project the surface finish profile—such as including a pattern, size, material removal direction, and dimensional tolerance—onto the first edge in the first model layer in response to the first edge intersecting the first surface. In particular, the computer system can: modify a geometry of the first edge according to the pattern, size, and material removal direction of the surface finish profile; access a dimensional tolerance associated with the surface finish profile and representing a minimal print accuracy along edges of the part to reproduce the surface finish profile on the first surface of the part; and label the first edge with the dimensional tolerance. In this implementation, the computer system can implement methods and techniques described below: to calculate a first erosion distance for the first edge, such as based on this dimensional tolerance and a distance of the first edge from a center or centroid of the first model layer; and to define an exposure shell inset from the surface finish profile—projected onto the first edge—by the first erosion distance.

In another implementation, the computer system: projects textures (e.g., 3D textures, bump maps) onto surface sectors according to surface finish callouts written to these surface sectors; and then implements methods and techniques described above to slice the 3D part model into a sequence of model layers. For example, a texture model can link: a) lay patterns (e.g., vertical, horizontal, radial, cross-hatched, circular, isotropic, concave dimple, and/or convex dimple lay patterns) defined in surface finish callouts; b) to 3D textures (e.g., 3D sawtooth, sinusoidal, square-wave profiles). The texture model can also: convert profile depth defined in a surface finish callout into 3D texture amplitude; convert outset %, inset %, or "on" layer edge specification in a surface finish callout into an offset between the neutral plane of a 3D texture and a 3D surface sector in a 3D part model; and define print parameters (e.g., target or maximum layer thickness, light-shell thickness and step size, light-shell exposure intensity, light-shell exposure duration) predicted to achieve the texture on the part. Accordingly, the computer system can modify surface segments within the 3D part model according to their surface finish callouts and surface parameters defined in this texture model. The computer system can then implement methods and techniques described above to slice the 3D part model into a sequence of model layers of various thicknesses based on both dimensional tolerances and surface finish callouts assigned to surface sectors in the 3D part model.

In yet another implementation shown in FIG. 3, the computer system: first calculates an erosion distance from a nominal (i.e., untextured) edge of a model layer; generates an outer shell inset from this edge by the erosion distances;

and then projects a particular surface finish (or "texture") profile onto the perimeter of the outer shell to complete the shell such that, when the shell is projected onto a layer of resin, the resin polymerizes into a part layer defining an edge that approximates the geometry of the model layer and a texture that approximates the particular surface finish. For example, the computer system can: access a surface finish profile assigned to a first surface of the part intersecting a first edge in a first model layer; calculate an erosion distance from the first edge based on characteristics of the 3D part model; initialize an outer shell for the first model layer based on this erosion distance, as described below; and then implement methods and techniques described above to project the surface finish profile onto a perimeter of the first outer exposure shell, such as based on pattern, size, and material removal direction characteristics defining the surface finish profile.

9. Image Layers in Print File

The computer system can then generate a sequence of print images based on each model layer extracted from the 3D part model.

9.1 Single Print Image with Image Erosion

In one implementation, for each model layer, the computer system: generates one print image defining an exposure region inset from a part perimeter defined in the model layer by an "erosion distance"; and define a set of print parameters predicted to yield polymerization that extends beyond the exposure region of the print image and falls within specified dimensional tolerances (or textural tolerances) of the part perimeter defined in the model layer. In one example, for a first model layer, the computer system calculates a set of print parameters for the first model layer, such as including: an exposure intensity proportional to a thickness of the first model layer (i.e., greater exposure intensity for thicker layers), proportional to a size (e.g., radius) of a smallest feature on an edge of the first model layer, and inversely proportional to a greatest distance from a center or centroid of the first model layer to an edge of the first model layer; and an exposure inversely duration proportional to a smallest feature in the model layer to produce a longer exposure duration and a lower exposure intensity given smaller edge features at greater distance from the center of the first model layer.

The computer system then calculates a single image erosion distance for the first model layer, such as proportional to the thickness of the first model layer and the exposure duration. For example, the computer system can inject edge characteristics of the first model layer into the material model—for the selected print material—to calculate the exposure intensity, exposure duration, and image erosion distance for the first model layer. In another example, the computer system retrieves a fixed image erosion distance from the material model associated with the material (e.g., resin) selected for the part.

Generally, more total energy per unit area (or total energy density) projected onto a volume of resin near a target perimeter of a part layer may: produce more exotherms near this target perimeter as the resin polymerizes; reduce dimensional control near this target perimeter; and reduce the minimum energy necessary to initiate polymerization of an adjacent unit volume resin with same part layer and in a next part layer. Resin temperature and polymerization boundary of a layer of resin may therefore be less predictable for model layers of larger areas. Furthermore, when exposed to a unit of radiation, the catalyst within the resin may be activated in higher volumetric densities near internal and external corners and sharps, thereby: increasing rates and distances that activated catalyst bleeds past a target perimeter of the part layer near these corners and sharps; increasing rates and distances of polymerization past these corners and sharps; and thus reducing dimensional accuracy and textural fidelity at these corners and sharps.

Therefore, for the first model layer, the computer system can: characterize feature sizes along the perimeter of the first model layer; and characterize distances of edge segments along the perimeter of the first model layer to the center (or centroid) of the cross-section defined in the first model layer. Accordingly, the computer system can: calculate a dynamic image erosion distance for individual edge segments along the perimeter of the first model layer, such as: proportional to the feature sizes represented by these edge segments; and proportional to distances of these edge segments to the center or centroid of the cross-section defined in the first model layer. The computer system can then: define a print image for a model layer based on multiple erosion distances from various edge segments in the model layer; set an exposure duration for the print image inversely proportional to these erosion distances (i.e., longer exposure durations for shorter erosion distances); and set an exposure intensity for the print image proportional to these erosion distances (i.e., lower exposure intensities for shorter erosion distances).

For example, for a first model layer in the set of model layers within the 3D part model, the computer system can: detect a first feature on a first edge in the first model layer; characterize a first distance between the first feature and a center or centroid of the first model layer; and calculate a first erosion distance inversely proportional to a first dimension (e.g., size, radius) of the first feature and proportional to the first distance. Similarly, the computer system can: detect a second feature on a second edge in the first model layer; characterize a second distance between the second feature and the center or centroid of the first model layer; and calculate a second erosion distance inversely proportional to a second dimension (e.g., size, radius) of the second feature and proportional to the second distance. The computer system can then define a first print image that includes: a first exposure area inset from the first edge of the first model layer by the first erosion distance; and a second exposure area inset from the second edge of the first model layer by the second erosion distance.

The computer system can then repeat this process for each other model layer and aggregate the resulting set of print images into one print file for the part.

9.2 Nested Layer Shells

In another implementation shown in FIGS. 1, 2A, 3, and 4A, for each model layer, the computer system can: generate a sequence of print images that define overlapping or non-overlapping "shells" that form an ordered set of exposure regions inset from a part perimeter defined in the model layer; and define a sequence of print parameters for these print images that are predicted to yield polymerization with high edge (i.e., textural) fidelity and within specified dimensional tolerances of the part perimeter defined in the model layer.

In one example, for a first model layer in the 3D part model, the computer system identifies and extracts discrete cross-sections, such as: discrete, closed edges; or lobed regions of a single cross-section approaching separation (or "necking"). The computer system then calculates a quantity of layer shells for a first cross-section in the first model layer: proportional to a ratio of the maximum radius of the first cross-section to the radius of the smallest feature on an edge of the first model layer (i.e., more layer shells given smaller features at greater distances from the center of the first cross-section); inversely proportional to the narrowest dimensional tolerance in the model layer (i.e., more layer shells given tighter dimensional tolerances in the model layer); and/or proportional to the thickness of the model layer (i.e., more layer shells given a thicker model layer). The computer system then segments the first cross-section into a set of nested shells of decreasing maximum and minimum feature sizes at greater distances from a center (or centroid) of the first cross-section.

For example, for single-shell model layer, the computer system can implement methods and techniques described above to: derive a set of print parameters for the first cross-section; calculate a single erosion distance for the first cross-section; generate a single image mask inset from the first cross-section by the erosion distance; and store the image mask, the set of print parameters, and the layer thickness of the first model layer in a single print image.

9.2.1 Two-Shell Model Layer

In one implementation, the computer system can: calculate a first center of a first model layer in the 3D part model; define a first inner shell boundary located at a first proportion of a distance from the first center to the first edge; define a first inner shell extending from the first center to the first inner shell boundary; define a first outer shell boundary at a second proportion—less than the first proportion—of the distance from the first center to the first edge; define a second outer shell boundary inset from the first edge by the first erosion distance; and define a first outer exposure shell extending from the first outer shell boundary to the second outer shell boundary such that the first outer exposure shell overlaps the first inner exposure shell by a difference between the first proportion and the second proportion.

For example, for a two-shell model layer, the computer system can: calculate a centroid of the first cross-section; calculate a first outer shell boundary located at 80% of the distance from the centroid to the edge of the first cross-section; define the first shell extending from the centroid to the first shell boundary; calculate a second inner shell boundary located at 75% (e.g., for a target shell layer overlap of 5%) of the distance from the centroid to the edge of the first cross-section; and calculate a second shell layer located between the second inner shell boundary and the outer edge of the first cross-section. The computer system can then implement methods and techniques described above to: derive a first set of print parameters for the first shell layer; calculate a first erosion distance for the first shell layer; generate a first image mask inset from the first shell layer by the first erosion distance; and store the first image mask, the first set of print parameters, and the layer thickness of the first model layer in a first print image for the first model layer. Similarly, the computer system can implement methods and techniques described above to: derive a second set of print parameters for the second shell layer; calculate a second erosion distance for the second shell layer; generate a second image mask inset from the second shell layer by the second erosion distance; and store the second image mask, the second set of print parameters, and the layer thickness of the first model layer in a second print image for the first model layer.

9.2.2 Three-Shell Model Layer

Figure 2B:
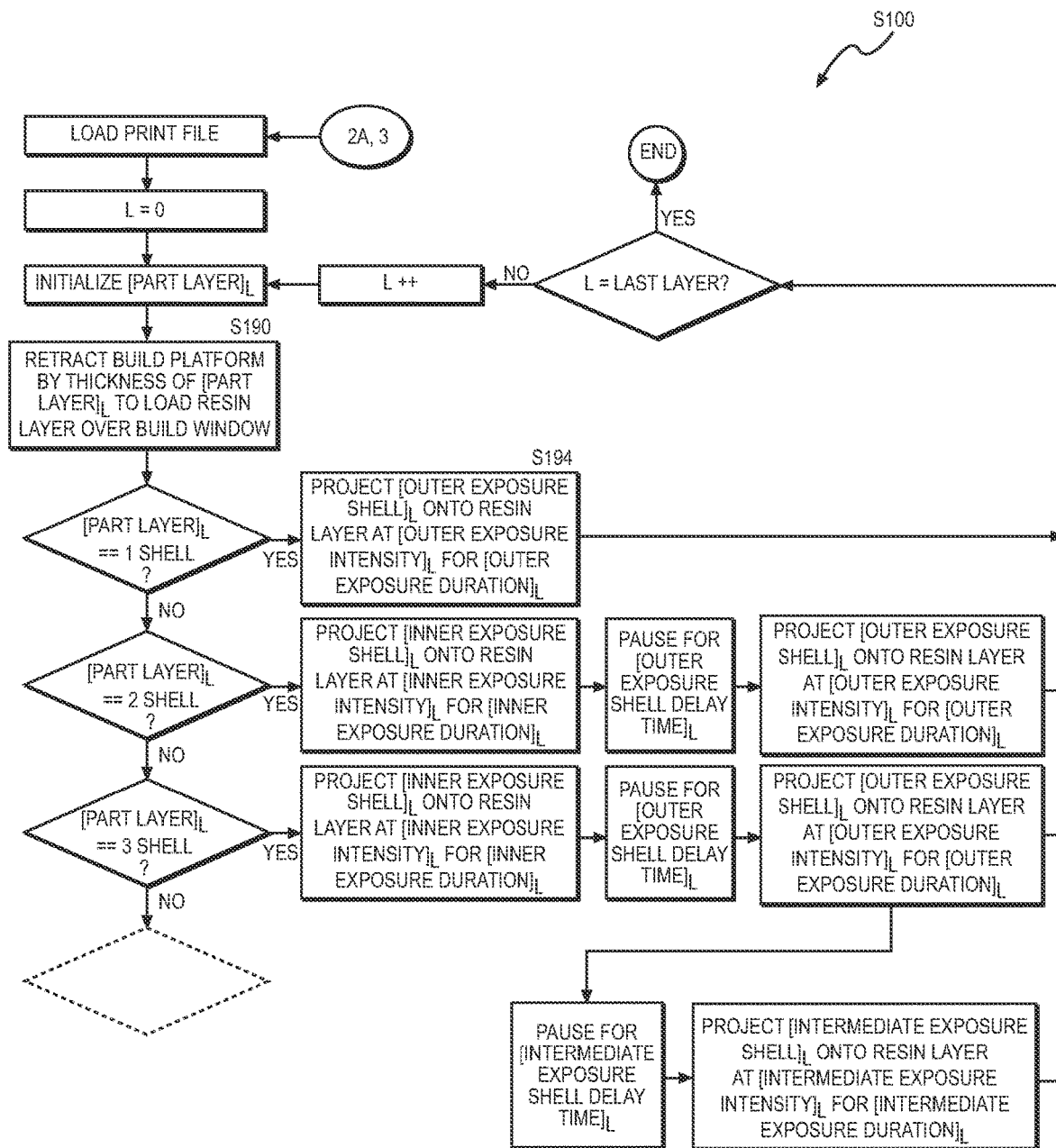

In a similar implementation shown in FIGS. 1, 2A, and 2B, the computer system: calculates a first center of the first model layer; defines a first inner shell boundary located at a first proportion of a distance from the first center to the first edge; defines a first inner shell extending from the first center to the first inner shell boundary; defines a first intermediate shell boundary located at a second proportion of the distance from the first center to the first edge; defines a second intermediate shell boundary located at a third proportion—greater than the second proportion—of the distance from the first center to the first edge; defines a first intermediate shell extending from the first intermediate shell boundary to the second intermediate shell boundary; defines a first outer shell boundary at a fourth proportion of the distance from the first center to the first edge; defines a second outer shell boundary inset from the first edge by the first erosion distance; and defines a first outer exposure shell extending from the first outer shell boundary to the second outer shell boundary.

For example, for this three-shell model layer, the computer system can implement methods and techniques described above to: calculate a centroid of the first cross-section; calculate a first outer shell boundary located at 80% of the distance from the centroid to the edge of the first cross-section; define the first shell extending from the centroid to the first shell boundary; calculate a second inner shell boundary located at 75% (e.g., for a target shell layer overlap of 5%) of the distance from the centroid to the edge of the first cross-section; calculate a second outer shell boundary located at 95% of the distance from the centroid to the edge of the first cross-section; calculate a second shell layer located between the second inner shell boundary and the second outer shell boundary; calculate a third inner shell boundary located at 94% (e.g., for a target shell layer overlap of 1%) of the distance from the centroid to the edge of the first cross-section; and calculate a third shell layer located between the third inner shell boundary and the outer edge of the first cross-section. The computer system can then implement methods and techniques described above to generate first, second, and third print images for the first model layer.

In this implementation, the computer system can further: assign a first inner exposure intensity to the first inner exposure shell; assign a first intermediate exposure intensity, less than the first inner exposure intensity, to the first intermediate exposure shell; and assign a first outer exposure intensity, less than the first intermediate exposure intensity, to the first outer exposure shell.

Therefore, the computer system can define narrower exposure shells at greater distances from the center of the first model layer and assign exposure intensities that decrease (and corresponding exposure durations that increase) to exposure shells at further distances from the center of the first model layer such that, when these exposure shells and exposure intensities are executed by the manufacturing system 100: the center region of a layer of resin rapidly reaches target polymerization and bonds to a preceding part layer when exposed according to the inner exposure shell and greatest exposure intensity; an outer region of the layer of resin exhibits lowest peak temperature and most controlled polymerization geometry when exposed according to the inner exposure shell exposure intensity; and an intermediate region of the layer of resin buffers the outer region from higher temperatures, greater polymerization density, and less dimensional control of polymerization occurring within the inner region.

9.2.3 Print Characteristics Versus Dimensional Tolerances

In one variation shown in FIG. 2A, the computer system sets a quantity of exposure shells and corresponding erosion distances for a model layer as a function of dimensional tolerances assigned to edges of the model layer.

In one implementation, for a first model layer in the 3D part model, the computer system: detects a first edge in the first model layer in Block S132; and assigns a first dimensional tolerance, in the set of dimensional tolerances, to the first edge in Block S134. For example, the computer system can: detect a set of 3D dimensional tolerances—defined on a set of surfaces, edges, and/or vertices on the part—that intersects the first edge in the first model layer; transform these 3D dimensional tolerances into 2D dimensional tolerance projections on the plane of the first model layer; and write or link these 2D dimensional tolerance projections to the first edge. The computer system can then define a first set of exposure shells in Block S150, such as including: a first outer exposure shell inset from the first edge by a first erosion distance that is inversely proportional to a first width of the first dimensional tolerance; and a first inner exposure shell inset from the first outer exposure shell and scheduled for exposure separately from (e.g., prior to) the first outer exposure shell.

The computer system can also define a first set of exposure intensities in Block S160, including: a first outer exposure intensity proportional to the first width of the first dimensional tolerance and assigned to the first outer exposure shell; and a first inner exposure intensity greater than the first outer exposure intensity and assigned to the first inner exposure shell.

The computer system can similarly define an exposure duration for each exposure shell inversely proportional to its assigned exposure intensity.

For example, given a wide first dimensional tolerance of 0.050" (e.g., +/−0.025") assigned to the first edge in the first model layer, the computer system can: specify two exposure shells for the first model layer; set a large inner erosion distance of 0.5", a short exposure duration of 0.50 second, and a high exposure intensity of 90% peak power for the inner exposure shell; set a large outer erosion distance of 0.05", a moderate exposure duration of 0.75 second, and a high exposure intensity of 70% peak power for the outer exposure shell; and generate a set of exposure shells based on these erosion distances.

Conversely, given a narrow first dimensional tolerance of 0.001" (e.g., +/−0.0005") assigned to a second edge in a second model layer, the computer system can: specify three exposure shells for the first model layer; set a large inner erosion distance of 0.25", a moderate exposure duration of 0.75 second, and a moderate exposure intensity of 80% peak power for the inner exposure shell; set a short inner erosion distance of 0.1", a moderate exposure duration of 1.0 second, and a moderate exposure intensity of 60% peak power for an intermediate exposure shell; set a small outer erosion distance of 0.005", a long exposure duration of 1.50 second, and a low exposure intensity of 20% peak power for the outer exposure shell; and generate a set of exposure shells based on these erosion distances. The computer system can then compile these print parameters and exposure shells into a print file for the part and offload this print file to the manufacturing system 100 for execution.

In another implementation, because exposure of features of smaller area may produces less increase in temperature across this smaller feature due to fewer exothermic reactions as the resin in this smaller area polymerizes, the computer system can assign a greater total exposure energy per unit area to this smaller feature (e.g., via greater exposure intensity and/or greater exposure duration) than to a larger feature; and vice versa.

Therefore, the computer system can: define a quantity of exposure shells—in a model layer—inversely proportional to a width of the dimensional tolerance assigned to an edge in the model layer.

In a similar implementation, the computer system sets a quantity of exposure shells and corresponding erosion distances for a model layer as a function of: sizes (e.g., radii) of features on edges of the model layer (which defines sensitivity to excess and incomplete edge polymerization); and distances from these features to an effective center of the model layer (which may predict resin temperate prior to exposure of an outer exposure shell).

In one example, the computer system: calculates a first center of a first model layer in the 3D part model; detects a first feature along a first edge in the first model layer; characterizes a first radius of the first feature; characterizes a first distance between the first feature and the first center; calculates a second center of a second model layer in the 3D part model; detects a second feature along a second edge in the second part layer; characterizes a second radius of the second feature, where the second radius is less than the first radius; and characterizes a second distance between the second feature and the second center, wherein the second distance is less than the first distance. In this example, the computer system then: defines a first quantity of exposure shells—for the first model layer—proportional to the first distance and inversely proportional to the first radius; and defines a second quantity of exposure shells—for the second model layer—proportional to the second distance and inversely proportional to the second radius, wherein the second quantity is less than the first quantity.

9.4 Preset Delay

In one variation shown in FIG. 2A, the computer system further calculates a delay time between exposing a layer of resin to a set of exposure shells—corresponding to a single model layer—to form a corresponding part layer of the part.

In one implementation, for the first model layer, the computer system: calculates a delay time between exposure of a first inner exposure shell and the first outer exposure shell proportional to an area of the first inner exposure shell and a first inner exposure intensity assigned to the inner exposure shell; schedules exposure of the first inner exposure shell prior to the first outer exposure shell; and schedules exposure of the first outer exposure shell after the delay time following exposure of the first inner exposure shell. Accordingly, the additive manufacturing system 100 can later: load a first volume of resin into a first interstitial volume over a build window; expose the first volume of resin according to the first inner exposure shell at the first inner exposure intensity to selectively polymerize resin within an inner region of the first volume of resin during a first exposure period; and then expose the first volume of resin according to the first outer exposure shell at the first outer exposure intensity—during a second exposure period succeeding the first exposure period by the delay time—to selectively polymerize resin within an outer region of the first volume of resin and to form a first part layer of the part such that a perimeter of the outer region of the first volume of resin approximating the first edge of the first model layer within the first dimensional tolerance.

In particular, exposure of a layer of resin by a first exposure shell—in a set of exposure shells corresponding to one model layer—by the manufacturing system 100 during a build cycle both: heats the resin inherently due to absorption of photons by the resin; and causes the resin to polymerize via an exothermic reaction. Sensitivity of the resin to polymerization via incident radiation (i.e., "exposure" by the manufacturing system 100) may increase at higher resin temperatures. Conversely, selectivity of resin polymerization at an edge of an exposure zone (or "polymerization control," or "edge crispness of the polymerization zone") may decrease at higher polymerization temperatures. However, after exposure and during polymerization, the resin may sink thermal energy into the build tray and other structures of the manufacturing system 100 and may therefore cool over time, thereby decreasing polymerization sensitivity and increase polymerization selectivity.

Accordingly, the computer system can predict a change in temperature of the resin after exposure by a first exposure shell—in a set of exposure shells corresponding to one model layer—by the manufacturing system 100 during a build cycle, such as based on: a first area of the first exposure shell; a first exposure intensity of the first exposure shell; a first exposure duration of the first exposure shell; a total exposure power of the first exposure shell (e.g., a product of the first area, the first exposure intensity, and the first exposure duration); a thickness of the model layer; and/or exothermic polymerization characteristics of the material selected for the part; etc. The computer system can then set a delay duration from exposure of the first exposure shell to exposure of the first exposure shell proportional to this temperature change.

9.5 Shell Definition by Model Surface Slope

In another variation shown in FIG. 3, the computer system sets a quantity of exposure shells and corresponding erosion distances for a model layer as a function of slope (i.e., angle) of the edge of the model layer and/or edges of the preceding model layers.

In particular, the computer system can assign fewer exposure shells, higher exposure intensities, and/or shorter erosion distances to a model layer for which all edges of the model layer are nearly vertical and/or angled past vertical (i.e., such that the preceding model layer is wider than the current model layer). In this example, the computer system can generate exposure shells that approach a final geometry and dimensional tolerances of the model layer with fewer exposure shells and higher exposure intensity because any excess vertical polymerization of resin according to these exposure shells may extend only into intentionally-polymerized areas of the preceding layer, thereby increase green strength of the part.

Conversely, the computer system can assign more exposure shells, lower exposure intensities, and/or longer erosion distances to a model layer containing edges with shallow slopes (e.g., such that the preceding model layer is narrower than the current model layer). In this example, the computer system can generate exposure shells that approach the final geometry and dimensional tolerances of the model layer with more exposure shells and lower exposure intensity in order to avoid polymerization of resin beyond the intentionally-polymerized areas of the preceding layer, which would otherwise increase dimensional error of the preceding layer and the part as a whole.

Therefore, after segmenting the 3D part model into a set of model layers of uniform thickness, the computer system can: characterize slopes of edges (e.g., tangent angles of edges relative to a horizontal plane) of a model layer; and set a quantity of exposure shells for the model layer inversely proportional to the shallowest slope of these edges. Then, for each exposure shell, the computer system can: set an erosion distance from each edge of the model layer inversely proportional to the slopes of these edges; and set an exposure intensity for the exposure shell inversely proportional to the slope of the shallowest edge in the model layer.

In a similar variation, the computer system can segment the 3D part model into model layers of variable thickness as a function of slope of edges of these model layers. For example, the computer system can: characterize a first slope of a first surface of the part model; characterize a second slope of a second surface of the part model that is shallower than the first slope; define a first thickness of a first model layer through the first surface proportional to the first slope; and define a second thickness of the second model layer through the second surface proportional to the second slope, wherein the second thickness is less than the first thickness. In this example, the computer system can further: define a first quantity of exposure shells for the first model layer proportional to the first thickness of the first model layer; and define a second quantity of exposure shells for the second model layer proportional to the second thickness of the second model layer wherein the second quantity of exposure shells is less than the first quantity of exposure shells.

9.6 Shell Exposure Order

The computer system can then aggregate print images for the first cross-section in the first model layer into a first sequence of print images for the first model layer.

For example, for a two-shell model layer described above, the computer system can specify exposure according to the inner exposure shell followed by exposure according to the outer exposure shell, such as with a preset delay between exposures to enable resin over the build window to cool and thus yield greater polymerization control when exposed to the outer exposure shell, as described below.

In another example, for a three-shell model layer described above, the computer system can specify exposure of the first (i.e., innermost) shell layer, followed by exposure of the second shell layer, and then exposure of the third shell layer, etc.

Alternatively, the computer system can specify exposure of the third (i.e., outermost) shell layer, followed by exposure of the first (i.e., innermost) shell layer, followed by exposure of the second (e.g., center) shell layer. Therefore, in this implementation, the manufacturing system 100 can execute this ordered sequence of print images to: polymerize resin at the perimeter of the part layer with the third shell layer; polymerize resin at the center of the part layer with the first shell layer while the perimeter of the part layer cools; and then fuse the perimeter and the center of the part layer by polymerizing resin therebetween by exposing the resin according to the second shell layer.

The computer system can: repeat the foregoing process for each other cross-section in the first model layer; define an order for these print images; and fuse print images for all cross-sections in the first model layer into a sequence of composite print images for the first model layer. The computer system can also repeat this process for each other model layer in the 3D part model and aggregate these sets of print images into a print file for the part.

9.7 Print Speed v. Dimensional Accuracy

In the foregoing implementations, the computer system can also render an option (e.g., a slider) to set a balance between print speed and dimensional accuracy of the part. Generally, a greater quantity of shell layers per 3D part model may require more time to process each corresponding part layer in the part, but may yield a part with greater dimensional and textural accuracy. Therefore, if the user elects to increase print speed (i.e., reduce print time) at the expense of dimensional accuracy, the computer system can reduce the average or maximum quantity of shell layers allocated per model layer in the 3D part model. Conversely, if the user elects to decrease print speed (i.e., increase print time) in order to improve dimensional accuracy, the computer system can increase the average or maximum quantity of shell layers allocated per model layer in the 3D part model.

In this variation, the computer system can also: interface with the user to set a balance between print speed and dimensional accuracy for discrete regions or subvolumes of the part; and then define shells within model layers and generate print images accordingly.

For example, the computer system can: render a prompt to select a print speed for the instance of the part within a user interface; receive a print speed specification response to the prompt; calculate, set, or adjust a set of dimensional tolerances—assigned to surfaces, edges, and vertices, etc. of the 3D part model—inversely proportional to the print speed specification; and then define a quantity of exposure shells for each model layer inversely proportional to the print speed specification.

More specifically, in response to the user selecting a faster print speed (i.e., shorter print duration) and lower dimensional accuracy, the computer system can reduce an average or maximum quantity of exposure shells generated per model layer of the 3D part model and increase the average exposure power assigned to each exposure shell. Accordingly, when executing the print file containing these fewer exposure shells, the manufacturing system 100 may complete construction of the part model in reduced time but with less control of polymerization in each part layer and therefore less dimensional control of the part due to increased average exposure power per exposure shell.

Conversely, in response to the user selecting a slower print speed (i.e., shorter print duration) and greater dimensional accuracy, the computer system can increase an average or minimum quantity of exposure shells generated per model layer of the 3D part model and decrease the average exposure power assigned to each exposure shell. Accordingly, when executing the print file containing these exposure shells, the manufacturing system 100 may complete construction of the part model over a longer time duration, but with greater control of polymerization in each part layer and therefore greater dimensional control of the part due to decreased average exposure power per exposure shell.

10. Wedge Print Images

In one variation, the computer system: isolates a cross section within a model layer; selects a point within the model layer; and segments the model layer into a set of wedges arranged about the point.

In one implementation, for a first model layer in the 3D part model, the computer system: identifies and extracts discrete cross-sections from the first model layer; selects a first cross-section in the first model layer; calculates a centroid of the first cross-section; and segments the first cross-section into a set of wedges arranged about the first model layer. For example, the computer system can define a larger quantity of thinner wedges spanning edge segments of a first cross-section characterized by smaller features, tighter dimensional tolerance callouts, smaller textural features, and/or greater distances from the centroid; and vice versa. The computer system can then generate a set of print images, each representing one wedge section extracted from the first model layer; and define a print order for the set of print images, such as an order that minimizes consecutive exposure of abutting wedge-shaped exposure regions on a first part layer of the part.

The computer system can then: repeat this process for each other cross-section in the first model layer to generate an ordered sequence of print images; repeat this process for each other model layer in the 3D part model; and aggregate these print images into a print file for the 3D part model.

10.1 Print Speed

In the foregoing implementation, the computer system can: render an option (e.g., a slider) to set a balance between print speed and dimensional accuracy of the part. Then, if the user elects to increase print speed (i.e., reduce print time) at the expense of dimensional accuracy, the computer system can reduce the average or maximum quantity of wedge layers allocated per model layer in the 3D part model. Conversely, if the user elects to decrease print speed (i.e., increase print time) in order to improve dimensional accuracy, the computer system can increase the average or maximum quantity of wedge layers allocated per model layer in the 3D part model.

In this variation, the computer system can also: interface with the user to set a balance between print speed and dimensional accuracy for discrete regions or subvolumes of the part; and then define wedge sections within model layers and generate print images accordingly.

11. Dimensional Accuracy Versus Green Strength

In the foregoing implementations, the computer system also can: render an option (e.g., a slider) to set a balance between green strength and dimensional accuracy of the part. Generally, greater exposure power (i.e., intensity and/or duration) projected onto a part layer may produce more complete activation of a catalyst in the resin, increase a rate of polymerization of the resin, and yield greater green strength in the part layer. However, the increased rate and magnitude of polymerization of the resin due to greater exposure power may also induce uncontrolled polymerization beyond the exposure region, which may reduce dimensional and textural accuracy of the part layer. Therefore, if the user elects to increase green strength of the part at the expense of dimensional accuracy, the computer system can increase the average or maximum exposure power allocated to each print layer in the print file for the 3D part model. Conversely, if the user elects to increase dimensional accuracy of the part at the expense of green strength, the computer system can decrease the average or maximum exposure power allocated to print layer in the print file for the 3D part model.

In this variation, the computer system can also: interface with the user to set a balance between print speed and dimensional accuracy for discrete regions or subvolumes of the part; and then model layers and generate print images accordingly.

12. Print Process

The computer system can then upload the print file to the manufacturing system 100, which can then implement methods and techniques described in U.S. patent application Ser. No. 16/672,410 to selectively expose sequential layers of resin—arranged across a build window—to radiation according to print images contained in the print file.

For example, when printing a first part layer during a build cycle, the manufacturing system 100 can: load a first volume of resin into a first interstitial volume over a build window of the manufacturing system 100; expose the first volume of resin according to a first inner print image at a first inner exposure intensity to selectively polymerize resin within an inner region of the first volume of resin during a first exposure period; and then expose the first volume of resin according to a first outer print image at a first outer exposure intensity to selectively polymerize resin within an outer region of the first volume of resin and to form a first part layer of the part during a second exposure period succeeding the first exposure period such that a perimeter of the outer region of the first volume of resin approximates the first edge of the first model layer.

In a similar example shown in FIGS. 2A and 2B, when printing a first part layer during a build cycle, the manufacturing system 100 can: load a first volume of resin into a first interstitial volume over the build window of the manufacturing system 100; expose the first volume of resin according to a first inner exposure shell at a first inner exposure intensity to selectively polymerize resin within an inner region of the first volume of resin during a first exposure period; then expose the first volume of resin according to the first outer exposure shell at the first outer exposure intensity to selectively polymerize resin within an outer region of the first volume of resin during a second exposure period succeeding the first exposure period such that a perimeter of the outer region of the first volume of resin approximates a first edge of the corresponding first model layer within its first assigned dimensional tolerance; and then expose the first volume of resin according to a first intermediate exposure shell at a first intermediate exposure intensity to selectively polymerize resin within an intermediate region of the first volume of resin during a third exposure period succeeding the second exposure period in order to fuse the inner region of the first volume of resin and the outer region of the first volume of resin and to form a first part layer of the part.

12.1 Closed-Loop Controls: Resin Temperature Detection

In one implementation, the manufacturing system 100 includes a thermal sensor (e.g., an infrared camera) configured to track temperatures across the build window during a build cycle. When printing a first part layer during a build cycle, the manufacturing system 100: fills a thin volume between the build window and a last part layer with a volume of resin; exposes this volume of resin to a first print image that defines a first shell layer derived from a first model layer in the 3D part model; reads a temperature gradient across the resin with the thermal sensor; and exposes the volume of resin to a second print image—that defines a second shell layer derived from the first model layer in the 3D part model—once a peak temperature in this volume of resin drops below a threshold temperature. The manufacturing system 100 then repeats this process: for print images defining each subsequent shell derived from the first model layer; and for each subsequent part layer during the build cycle.

Furthermore, in this implementation, after exposing a volume of resin across the build window to a first print image when printing a first layer of a part, the manufacturing system 100 can: detect a polymerization zone—exhibiting temperatures above a threshold polymerization temperature—across this first part layer and adjust print parameters for a next print image based on a difference between this polymerization zone and the first print image. For example, if the perimeter of this polymerization zone is inwardly offset by a consistent distance from the perimeter of the first print image, the manufacturing system 100 can increase the exposure intensity for a next print image, increase an exposure duration for the next print image, and/or decrease a delay time before executing the next print image, such as for a next print image defining a next shell in the current model layer or for a next print image defining a next model layer in the 3D part model; and vice versa.

Alternatively, if the perimeter of this polymerization zone is outwardly offset from the perimeter of the first print image by a greatest distance around large features, the manufacturing system 100 can decrease the exposure intensity, decrease the exposure duration, and/or increase a delay time before exposure for a next print image defining a next shell in the current model layer; and vice versa.

13. Local Print Image Generation

In one variation, the manufacturing system 100 locally executes the foregoing processes to (re)define shells within model layers in the 3D part model and/or within print images in the print file and to generate new print images depicting these shells based on thermal gradients across the build window during a build cycle.

13.1 Inter-Layer Print Image Generation

In one implementation, after completing a first part layer, the manufacturing system 100: reads a temperature gradient across the first part layer with the thermal sensor; and sets a quantity of shells for the next print layer based on this temperature gradient. For example, the manufacturing system 100 can set the quantity of shells for the next print layer proportional to a peak temperature in this temperature gradient, proportional to a difference between the peak temperature in the temperature gradient and a target polymerization temperature, or proportional to a difference between minimum and peak temperatures within the exposed region of the resin. The manufacturing system 100 then: accesses a next model layer for the part; implements methods and techniques described above to segment the next model layer into a quantity of shells and to generate a set of print images depicting these shells; fills a thin volume between the build window and the last layer with a volume of resin; and sequentially exposes this volume of resin according to these print images. The manufacturing system 100 then repeats this process for each subsequent part layer during the build cycle.

13.2 Intra-Layer Print Image Generation

Additionally or alternatively, when printing a part layer during the build cycle, the manufacturing system 100 can: fill the thin volume between the build window and a last part layer completed at the manufacturing system 100 with a volume of resin; implement methods and techniques described above to: calculate an initial quantity of shells for the current part layer; segment a model layer for the current print layer into this quantity of layer shells; and then compile these layer shells into a sequence of print images for this part layer. The manufacturing system 100 can then: expose the volume of resin to a first print image—depicting a first shell layer—in this set; and read a temperature gradient across the part layer with the thermal sensor. The manufacturing system 100 can then increase the quantity of shells for the remaining region of the cross-section defined in the current model layer if: a) a peak temperature in the part layer exceeds a high threshold temperature (e.g., correlated with runaway or excess polymerization laterally through the part layer or vertically to a preceding part layer); b) a region of the resin near and outside of an exposed region defined by this first print image exceeds a threshold temperature associated with polymerization; or c) a temperature gradient across this exposed region of the resin exceeds a threshold temperature difference; etc. Conversely, the manufacturing system 100 can decrease the quantity of shells for the remaining region of the current print layer if: a) a minimum temperature in the exposed region of the part layer is less than a low threshold temperature (e.g., correlated with poor green strength); or b) the resin near and inside of an exposed region defined by this first print image falls below the threshold temperature associated with polymerization. The manufacturing system 100 can then: re-segment the remaining region of this cross-section into this new quantity of layer shells; compile these layer shells into a new sequence of print images for this print layer; expose the volume of resin to a next, revised print image—depicting a next, revised shell layer—in this set; and repeat the foregoing process to complete the current part layer.

14. Print File Selection Based on Pre-Exposure Resin Temperature

In one variation shown in FIGS. 4A and 4B, the computer system: generates multiple print files, each containing a different average or peak quantity of shell layers (or wedge layers) per model layer of the 3D part model and associated with different pre-exposure resin temperatures; and uploads these print files to the manufacturing system 100 in preparation for one build cycle. In this variation, the manufacturing system 100 can implement methods and techniques similar to those described above to: detect temperatures of resin arranged between the build window and the preceding part layer; select a particular set of print images corresponding to the current temperature of the resolution; and selectively exposure this layer of resin according to the particular print images.

In particular, resin with a higher pre-exposure resin temperatures may require less energy to polymerize and exhibit less polymerization control when exposed; and vice versa. Therefore, for a model layer in the part model, the computer system can generate: a first set of (e.g., two) exposure shells with higher exposure intensities and/or longer exposure durations and associated with a first pre-exposure resin temperature range; and a second set of (e.g., three) exposure shells with lower exposure intensities and/or shorter exposure durations and associated with a second, higher pre-exposure resin temperature range.

For example, the computer system can: detect a first edge in a first model layer in Block S132; calculate a first erosion distance proportional to a first resin temperature range; define a first set of exposure shells in Block S150 including a first outer exposure shell inset from the first edge by a first erosion distance and a first inner exposure shell inset from the first outer exposure shell and scheduled for exposure separately from (e.g., before) the first outer exposure shell; define a first set of exposure intensities in Block S160 including a first outer exposure intensity assigned to the first outer exposure shell and a first inner exposure intensity greater than the first outer exposure intensity and assigned to the first inner exposure shell; and assign the first set of exposure shells and the first set of exposure intensities to the first resin temperature range.

Similarly, in this example, the computer system can: calculate a first alternate erosion distance—less than the first erosion distance—proportional to a second resin temperature range less than the first resin temperature range; define a first alternate set of exposure shells including a first alternate outer exposure shell inset from the first edge by the first alternate erosion distance; define a first alternate set of exposure intensities including a first alternate outer exposure intensity greater than the first outer exposure intensity; and assign the first alternate set of exposure shells and the first alternate set of exposure intensities to the second resin temperature range. The computer system can then compile these exposure shells and alternate exposure shells into print images for the first layer of the 3D part model.

In this example, the manufacturing system 100 can then: load these print images; load a first volume of resin into a first interstitial volume over a build window; and detect a temperature of the first volume of resin, such as via the thermal image sensor described above. Then, in response to the temperature of the first volume of resin falling within the first resin temperature range, the computer system can: expose the first volume of resin according to the first inner exposure shell at the first inner exposure intensity to selectively polymerize resin within an inner region of the first volume of resin; and expose the first volume of resin according to the first outer exposure shell at the first outer exposure intensity to selectively polymerize resin within an outer region of the first volume of resin and to form a first part layer of the part such that a perimeter of the outer region of the first volume of resin approximates the first edge of the first model layer.

14.1 Temperature Gradient

In another implementation, after exposing a first part layer to a first set of print images according to a first print file during the build, the computer system can read a temperature gradient across the build window from the thermal sensor. The manufacturing system 100 can then switch to a print file containing a greater average or peak quantity of shell layers per model layer in preparation for printing a next layer of the part if: a) the temperature gradient across the exposed region of the first part layer is large (which may indicate a wide range of green strengths across this first part layer and therefore increased opportunity for internal stresses and warping across the corresponding region of the completed part); and b) this temperature gradient closely follows the edge of the exposed region of the first part layer (i.e., this temperature gradient exhibits consistent offset from the edge of the exposed region of the part layer over multiple temperature ranges). More specifically, if the last part layer exhibits a temperature gradient that is uniform but steeper than a target temperature gradient, the manufacturing system 100 can elect to polymerize the next part layer with a greater quantity of print images depicting more shell layers in the next model layer in order to reduce the temperature gradient across the next part layer, achieve more consistent green strength across this next part layer, and improve dimensional tolerances across this next part layer.

Conversely, the manufacturing system 100 can elect the same print file for the next layer of the part, reduce the nominal light intensity of print images depicting inner shells of the next model layer, and/or increase delay time between exposure of successive print images for this next part layer if: a) the temperature gradient across the exposed region of the first part layer is large; and b) the temperature gradient is largest across large features in the first part layer. More specifically, if the last part layer exhibits a temperature gradient that is non-uniform around larger features, the manufacturing system 100 can elect the same quantity of print images depicting the same quantity of shell layers in the next model layer but decrease exposure power for inner shells—which corresponding to larger features—and/or increase a delay time between print image exposures for this next part layer in order to reduce the temperature gradient across the next part layer, achieve more consistent green strength across larger features in this next part layer, improve dimensional tolerances across this next part layer, and/or reduce internal stresses within the part.

The systems and methods described herein can be embodied and/or implemented at least in part as a machine configured to receive a computer-readable medium storing computer-readable instructions. The instructions can be executed by computer-executable components integrated with the application, applet, host, server, network, website, communication service, communication interface, hardware/firmware/software elements of a user computer or mobile device, wristband, smartphone, or any suitable combination thereof. Other systems and methods of the embodiment can be embodied and/or implemented at least in part as a machine configured to receive a computer-readable medium storing computer-readable instructions. The instructions can be executed by computer-executable components integrated by computer-executable components integrated with apparatuses and networks of the type described above. The computer-readable medium can be stored on any suitable computer readable media such as RAMs, ROMs, flash memory, EEPROMs, optical devices (CD or DVD), hard drives, floppy drives, or any suitable device. The computer-executable component can be a processor but any suitable dedicated hardware device can (alternatively or additionally) execute the instructions.

As a person skilled in the art will recognize from the previous detailed description and from the figures and claims, modifications and changes can be made to the embodiments of the invention without departing from the scope of this invention as defined in the following claims.

I claim:

1. A method comprising:
   accessing a part model comprising a three-dimensional representation of a part;
   segmenting the part model into a set of model layers;
   for a first model layer in the set of model layers:
      a first edge in the first model layer;
      a first dimensional tolerance, in a set of dimensional tolerances, to the first edge;
      a first set of exposure shells comprising:
         a first outer exposure shell inset from the first edge by a first erosion distance inversely proportional to a first width of the first dimensional tolerance; and
         a first inner exposure shell inset from the first outer exposure shell and scheduled for exposure separately from the first outer exposure shell; and
      defining a first set of exposure energies comprising:
         a first outer exposure energy assigned to the first outer exposure shell; and
         a first inner exposure energy greater than the first outer exposure energy and assigned to the first inner exposure shell;
   for a second model layer in the set of model layers:
      detecting a second edge in the second model layer;
      assigning a second dimensional tolerance, in the set of dimensional tolerances, to the second edge;
      defining a second set of exposure shells comprising:
         a second outer exposure shell inset from the second edge by a second erosion distance inversely proportional to a second width of the second dimensional tolerance; and
      defining a second set of exposure energies comprising:
         a second outer exposure energy proportional to the second width of the second dimensional tolerance and assigned to the second outer exposure shell; and
   compiling the first set of exposure shells, the first set of exposure energies, the second set of exposure shells, and the second set of exposure energies into print image in a digital print file; and
   serving the print file to an additive manufacturing system configured to selectively expose layers of resin according to print images in the digital print file to manufacture the part.

2. The method of claim 1, further comprising:
   for the first model layer:
      defining a first set of exposure durations comprising:
         a first outer exposure duration inversely proportional to the first outer exposure energy and assigned to the first outer exposure shell; and
         a first inner exposure duration inversely proportional to the first inner exposure energy, less than the first outer exposure duration, and assigned to the first inner exposure shell; and
   for the second model layer, defining a second set of exposure durations comprising:
      a second outer exposure duration inversely proportional to the second outer exposure energy and assigned to the second outer exposure shell; and
   by the additive manufacturing system:
      loading a first volume of resin into a first interstitial volume over a build window;
      exposing the first volume of resin according to the first inner exposure shell at the first inner exposure energy for the first inner exposure duration to selectively polymerize resin within an inner region of the first volume of resin;
      exposing the first volume of resin according to the first outer exposure shell at the first outer exposure energy for the first outer exposure duration to selectively polymerize resin within an outer region of the first volume of resin and to form a first part layer of the part, a perimeter of the outer region of the first volume of resin approximating the first edge of the first model layer within the first dimensional tolerance;
      loading a second volume of resin into a second interstitial volume between the build window and the first part layer of the part; and
      exposing the second volume of resin according to the second outer exposure shell at the second outer exposure energy for the second outer exposure duration to selectively polymerize resin within a region of the second volume of resin and to form a second part layer of the part, a perimeter of the region of the second volume of resin approximating the second edge of the second model layer within the second dimensional tolerance.

3. The method of claim 1, further comprising:
   for the first model layer:
      calculating a delay time between exposure of the first inner exposure shell and the first outer exposure shell proportional to an area of the first inner exposure shell and the first inner exposure energy;
      scheduling exposure of the first inner exposure shell prior to the first outer exposure shell; and
      scheduling exposure of the first outer exposure shell after the delay time following exposure of the first inner exposure shell; and
   by the additive manufacturing system:
      loading a first volume of resin into a first interstitial volume over a build window;
      during a first exposure period, exposing the first volume of resin according to the first inner exposure shell at the first inner exposure energy to selectively polymerize resin within an inner region of the first volume of resin; and
      during a second exposure period succeeding the first exposure period by the delay time, exposing the first volume of resin according to the first outer exposure shell at the first outer exposure energy to selectively polymerize resin within an outer region of the first volume of resin and to form a first part layer of the part, a perimeter of the outer region of the first volume of resin approximating the first edge of the first model layer within the first dimensional tolerance.

4. The method of claim 1:
further comprising, within a user interface:
  rendering a prompt to select a print speed for the instance of the part; and
  receiving a print speed specification responsive to the prompt;
further comprising calculating the set of dimensional tolerances inversely proportional to the print speed specification; and
wherein defining the first set of exposure shells for the first model layer comprises:
  defining a first quantity of exposure shells, in the first set of exposure shells, inversely proportional to the print speed specification.

5. The method of claim 1:
further comprising accessing a surface finish profile assigned to a first surface of the part intersecting the first edge in the first model layer;
wherein defining the first set of exposure shells comprises projecting the surface finish profile onto a perimeter of the first outer exposure shell, the perimeter of the first outer exposure shell inset from the first edge in the first model layer by the first erosion distance.

6. The method of claim 1:
wherein defining the first set of exposure shells for the first model layer comprises:
  defining a first quantity of exposure shells, in the first set of exposure shells, inversely proportional to the first width of the first dimensional tolerance; and
wherein defining the second set of exposure shells for the second model layer comprises:
  defining a second quantity of exposure shells, in the second set of exposure shells, inversely proportional to the second width of the second dimensional tolerance, the second quantity less than the first quantity, the first width less than the second width.

7. The method of claim 1:
further comprising:
  calculating a first center of the first model layer;
  detecting a first feature along the first edge;
  characterizing a first radius of the first feature;
  characterizing a first distance between the first feature and the first center;
  calculating a second center of the second model layer;
  detecting a second feature along the second edge;
  characterizing a second radius of the second feature, the second radius less than the first radius; and
  characterizing a second distance between the second feature and the second center, the second distance less than the first distance;
wherein defining the first set of exposure shells for the first model layer comprises:
  defining a first quantity of exposure shells, in the first set of exposure shells, proportional to the first distance and inversely proportional to the first radius; and
wherein defining the second set of exposure shells for the second model layer comprises:
  defining a second quantity of exposure shells, in the second set of exposure shells, proportional to the second distance and inversely proportional to the second radius, the second quantity less than the first quantity.

8. The method of claim 1:
further comprising:
  characterizing a first slope of a first surface of the part model, the first surface intersecting the first edge;
  characterizing a second slope of a second surface of the part model, the second slope shallower than the first slope, the second surface intersecting the second edge;
  defining a first thickness of the first model layer proportional to the first slope; and
  defining a second thickness of the second model layer proportional to the second slope, the second thickness less than the first thickness;
wherein defining the first set of exposure shells for the first model layer comprises:
  defining a first quantity of exposure shells, in the first set of exposure shells, proportional to the first thickness of the first model layer; and
wherein defining the second set of exposure shells for the second model layer comprises:
  defining a second quantity of exposure shells, in the second set of exposure shells, proportional to the second thickness of the second model layer.

9. The method of claim 1, wherein defining the first set of exposure shells comprises:
  calculating a first center of the first model layer;
  defining a first inner shell boundary located at a first proportion of a distance from the first center to the first edge;
  defining the first inner shell extending from the first center to the first inner shell boundary;
  defining a first outer shell boundary at a second proportion of the distance from the first center to the first edge, the second proportion less than the first proportion;
  defining a second outer shell boundary inset from the first edge by the first erosion distance; and
  defining the first outer exposure shell extending from the first outer shell boundary to the second outer shell boundary, the first outer exposure shell overlapping the first inner exposure shell by a difference between the first proportion and the second proportion.

10. The method of claim 1:
wherein defining the first set of exposure shells comprises:
  calculating a first center of the first model layer;
  defining a first inner shell boundary located at a first proportion of a distance from the first center to the first edge;
  defining the first inner shell extending from the first center to the first inner shell boundary;
  defining a first intermediate shell boundary located at a second proportion of the distance from the first center to the first edge;
  defining a second intermediate shell boundary located at a third proportion of the distance from the first center to the first edge, the third proportion greater than the second proportion;
  defining a first intermediate shell extending from the first intermediate shell boundary to the second intermediate shell boundary;
  defining a first outer shell boundary at a fourth proportion of the distance from the first center to the first edge;
  defining a second outer shell boundary inset from the first edge by the first erosion distance; and
  defining the first outer exposure shell extending from the first outer shell boundary to the second outer shell boundary; and further comprising, for the first model layer:
defining a first intermediate exposure energy greater than the first outer exposure energy and assigned to the first intermediate exposure shell;
scheduling exposure of the first outer exposure shell following exposure of the first inner exposure shell; and
scheduling exposure of the first intermediate exposure shell following exposure of the first outer exposure shell.

11. The method of claim 10, further comprising, by the additive manufacturing system:
loading a first volume of resin into a first interstitial volume over a build window;
during a first exposure period, exposing the first volume of resin according to the first inner exposure shell at the first inner exposure energy to selectively polymerize resin within an inner region of the first volume of resin;
during a second exposure period succeeding the first exposure period, exposing the first volume of resin according to the first outer exposure shell at the first outer exposure energy to selectively polymerize resin within an outer region of the first volume of resin, a perimeter of the outer region of the first volume of resin approximating the first edge of the first model layer within the first dimensional tolerance; and
during a third exposure period succeeding the second exposure period, exposing the first volume of resin according to the first intermediate exposure shell at the first intermediate exposure energy to selectively polymerize resin within an intermediate region of the first volume of resin, to fuse the inner region of the first volume of resin and the outer region of the first volume of resin, and to form a first part layer of the part.

12. The method of claim 1:
further comprising:
assigning the first set of exposure shells and the first set of exposure energies to a first resin temperature range;
wherein defining the first set of exposure shells comprises defining the first outer exposure shell inset from the first edge by the first erosion distance inversely proportional to the first width of the first dimensional tolerance and proportional to the first resin temperature range;
further comprising:
defining a first alternate set of exposure shells comprising:
a first alternate outer exposure shell inset from the first edge by a first alternate erosion distance less than the first erosion distance;
defining a first alternate set of exposure energies comprising:
a first alternate outer exposure energy proportional to the first width of the first dimensional tolerance and greater than the first outer exposure energy; and
assigning the first alternate set of exposure shells and the first alternate set of exposure energies to a second resin temperature range less than the first resin temperature range; and
further comprising, by the additive manufacturing system:
loading a first volume of resin into a first interstitial volume over a build window;
detecting a temperature of the first volume of resin; and
in response to the temperature of the first volume of resin falling within the first resin temperature range:
exposing the first volume of resin according to the first inner exposure shell at the first inner exposure energy to selectively polymerize resin within an inner region of the first volume of resin; and
exposing the first volume of resin according to the first outer exposure shell at the first outer exposure energy to selectively polymerize resin within an outer region of the first volume of resin and to form a first part layer of the part, a perimeter of the outer region of the first volume of resin approximating the first edge of the first model layer within the first dimensional tolerance.

13. The method of claim 12:
further comprising, for the first model layer in the set of model layers:
detecting a third edge in the first model layer; and
assigning a third dimensional tolerance, in the set of dimensional tolerances, to the third edge, a third width of the third dimensional tolerance greater than the first width of the first dimensional tolerance; and
wherein defining the first set of exposure shells comprises defining the first inner exposure shell:
inset from the first outer exposure shell;
inset from the first edge by a first distance inversely proportional to the first width of the first dimensional tolerance; and
inset from the third edge by a third distance inversely proportional to the third width of the third dimensional tolerance, the third distance less than the first distance.

14. A method comprising:
accessing a part model comprising a three-dimensional representation of a part;
segmenting the part model into a set of model layers;
for a first model layer in the set of model layers:
characterizing a first distance of a first feature, on a first edge in the first model layer, from a first center of the first model layer;
calculating a first erosion distance inversely proportional to a first dimension of the first feature and proportional to the first distance; and
defining a first print image, in a set of print images, comprising a first exposure area inset from the first edge of the first model layer by the first erosion distance;
for a second model layer in the set of model layers:
characterizing a second distance of a second feature, on a second edge in the second model layer, from a second center of the second model layer;
calculating a second erosion distance inversely proportional to a second dimension of the second feature and proportional to the second distance; and
defining a second print image, in the set of print images, comprising a second exposure area inset from the second edge of the second model layer by the second erosion distance;
compiling the set of print images into a digital print file; and
serving the print file to an additive manufacturing system configured to selectively expose layers of resin according to print images in the digital print file to manufacture the part.

15. The method of claim 14:
further comprising, for the first model layer:
detecting a third feature on a third edge in the first model layer;

characterizing a third distance of the third feature from the first center of the first model layer; and calculating a third erosion distance, different from the first erosion distance, inversely proportional to a third dimension of the third feature and proportional to the third distance; and wherein defining the first print image comprises defining the first print image:

inset from the first edge of the first model layer by the first erosion distance; and inset from the third edge of the first model layer by the third erosion distance.

16. The method of claim 14:

further comprising:

accessing a set of dimensional tolerances for the part model;

assigning a first dimensional tolerance, in the set of dimensional tolerances, to the first feature;

defining a set of exposure energies comprising:

a first exposure energy proportional to the first width of the first dimensional tolerance and assigned to the first print image; and defining a set of exposure durations comprising:

a first exposure duration inversely proportional to the first exposure energy and assigned to the first print image;

wherein calculating the first erosion distance comprises calculating the first erosion distance further proportional to the first dimensional tolerance; and wherein compiling the set of print images into the digital print file comprises compiling the set of print images, the set of exposure energies, and the set of exposure durations into the digital print file.

17. The method of claim 16, further comprising, by the additive manufacturing system:

loading a first volume of resin into a first interstitial volume over a build window; and exposing the first volume of resin according to the first print image at the first exposure energy for the first exposure duration to selectively polymerize resin within a region of the first volume of resin and to form a first part layer of the part approximating the first edge of the first model layer within the first dimensional tolerance.

18. The method of claim 14:

further comprising:

accessing a surface finish profile assigned to a first surface of the part;

in response to the first edge in the first model layer intersecting the first surface, projecting the surface finish profile onto the first edge in the first model layer;

defining the first feature, on the first edge in the first model layer, based on the surface finish profile;

characterizing the first dimension of the first feature based on the surface finish profile;

defining a set of exposure energies comprising a first exposure energy proportional to the first dimension and assigned to the first print image; and defining a set of exposure durations comprising a first exposure duration inversely proportional to the first exposure energy and assigned to the first print image;

wherein calculating the first erosion distance comprises calculating the first erosion distance further proportional to the first exposure energy and inversely proportional to the first exposure duration; and wherein compiling the set of print images into the digital print file comprises compiling the set of print images, the set of exposure energies, and the set of exposure durations into the digital print file.

19. The method of claim 14, further comprising:

for the first model layer defining a first inner print image inset from the first edge of the first model layer by a first inner distance greater than the first erosion distance; and defining a first set of exposure energies comprising:

a first exposure energy assigned to the first print image; and a first inner exposure energy greater than the first exposure energy and assigned to the first inner print image; and by the additive manufacturing system:

loading a first volume of resin into a first interstitial volume over a build window;

during a first exposure period, exposing the first volume of resin according to the first inner print image at the first inner exposure energy to selectively polymerize resin within an inner region of the first volume of resin; and during a second exposure period succeeding the first exposure period, exposing the first volume of resin according to the first print image at the first exposure energy to selectively polymerize resin within an outer region of the first volume of resin and to form a first part layer of the part, a perimeter of the outer region of the first volume of resin approximating the first edge of the first model layer.

20. A method comprising:

accessing a part model comprising a three-dimensional representation of a part;

segmenting the part model into a set of model layers;

for a first model layer in the set of model layers:

characterizing a first distance of a first feature, on a first edge in the first model layer, from a first center of the first model layer;

calculating a first erosion distance proportional to the first distance and associated with a first pre-exposure temperature range;

defining a first print image, in a set of print images, comprising a first exposure area inset from the first edge of the first model layer by the first erosion distance;

calculating a first alternate erosion distance proportional to the first distance and associated with a first alternate pre-exposure temperature range, the first alternate erosion distance greater than the first erosion distance, the first alternate pre-exposure temperature range greater than the first pre-exposure temperature range; and defining a first alternate print image, in the set of print images, comprising a first alternate exposure area inset from the first edge of the first model layer by the first alternate erosion distance; and by an additive manufacturing system:

loading a first volume of resin into a first interstitial volume over a build window;

detecting a temperature of the first volume of resin; and in response to the temperature of the first volume of resin falling within the first resin temperature range, exposing the first volume of resin according to the first print image to selectively polymerize resin within a first region of the first volume of resin and to form a first part layer of the part, the first region of the first volume of resin approximating the first edge of the first model layer.

\* \* \* \* \*